(12) United States Patent
Kamiya

(10) Patent No.: US 12,112,083 B2
(45) Date of Patent: Oct. 8, 2024

(54) SERVER, TRANSFER METHOD, AND NON-TRANSITORY COMPUTER-READABLE STORAGE MEDIUM THEREFOR

(71) Applicant: BROTHER KOGYO KABUSHIKI KAISHA, Nagoya (JP)

(72) Inventor: Nobuyuki Kamiya, Anjo (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/352,687

(22) Filed: Jul. 14, 2023

(65) Prior Publication Data
US 2023/0359417 A1 Nov. 9, 2023

Related U.S. Application Data

(63) Continuation of application No. PCT/JP2021/034986, filed on Sep. 24, 2021.

(30) Foreign Application Priority Data

Jan. 18, 2021 (JP) .................. 2021-005928

(51) Int. Cl.
G06F 3/12 (2006.01)
(52) U.S. Cl.
CPC .......... G06F 3/1261 (2013.01); G06F 3/1204 (2013.01); G06F 3/1288 (2013.01)
(58) Field of Classification Search
None
See application file for complete search history.

(56) References Cited

U.S. PATENT DOCUMENTS 6,654,137 B1 * 11/2003 Yagita .................. G06F 3/1207
358/1.15
8,873,086 B2 * 10/2014 Jones .................... G06Q 30/04
705/317

(Continued)

FOREIGN PATENT DOCUMENTS

JP 2002137501 A 5/2002
JP 2002278392 A 9/2002

(Continued)

OTHER PUBLICATIONS

International Search Report dated Dec. 28, 2021 issued in PCT/JP2021/034986.

(Continued)

*Primary Examiner* — Helen Zong
(74) *Attorney, Agent, or Firm* — Scully, Scott, Murphy & Presser, P.C.

(57) ABSTRACT

A server is configure to communicate with an information processing device and a recording device. The server includes a server memory capable of storing recording device identification information and server-side recording permission information indicating a server-side permitted recording amount in an associated manner. The server performs a transferring operation in response to receiving a transferring instruction from the information processing device. The transferring operation includes storing server-side recording permission information, which is stored in the server memory in an associated manner with first recording device identification information identifying a first recording device, in the server memory in an associated manner with second recording device identification information identifying a second recording device.

15 Claims, 17 Drawing Sheets

(56) References Cited

U.S. PATENT DOCUMENTS

| | | | | |
|---|---|---|---|---|
| 9,827,714 | B1* | 11/2017 | Ruxton | G06F 3/1285 |
| 2007/0174218 | A1* | 7/2007 | Kojima | G06Q 20/18 |
| | | | | 705/410 |
| 2018/0101336 | A1* | 4/2018 | Onomatsu | G06F 3/1287 |
| 2018/0183970 | A1* | 6/2018 | Kawai | H04N 1/32122 |

FOREIGN PATENT DOCUMENTS

| | | | |
|---|---|---|---|
| JP | 2003122209 A | 4/2003 | |
| JP | 2007276177 A | 10/2007 | |
| JP | 2012022549 A | 2/2012 | |
| JP | 2016164720 A | 9/2016 | |

OTHER PUBLICATIONS

International Preliminary Report on Patentability and Written Opinion dated Jul. 4, 2023 issued in PCT/JP2021/034986 together with English language translation.
Notice of Reasons for Refusal dated Aug. 6, 2024 received in Japanese Patent Application No. 2021-005928.

* cited by examiner

PRINTER MANAGEMENT TABLE PT

| DEVICE ID | dv1 |
|---|---|
| PRINTABLE NUMBER OF SHEETS | pr1 |
| REMAINING INK AMOUNT | ink1 |
| ACTIVATION INFORMATION | ○ |
| DEVICE SETTING | dc1 |
| SYNCHRONIZATION DATE AND TIME | cd1 |

FIG. 2

SERVER MANAGEMENT TABLE ST

| DEVICE ID | dv1 | dv2 | dv3 |
|---|---|---|---|
| PRINTABLE NUMBER OF SHEETS | pr1 | pr2 | pr3 |
| ACTIVATION INFORMATION | ○ | × | ○ |
| REPLACEMENT REQUEST INFORMATION | × | × | × |
| NUMBER OF SHEETS TO BE CHARGED | cg1 | cg2 | cg3 |

SERVER, TRANSFER METHOD, AND NON-TRANSITORY COMPUTER-READABLE STORAGE MEDIUM THEREFOR

REFERENCE TO RELATED APPLICATIONS

This application is a continuation application based on International Patent Application PCT/JP2021/034986 filed on Sep. 24, 2021, which was filed claiming priority from Japanese Patent Application No. 2021-005928 filed on Jan. 18, 2021. The entire contents of the International Patent Application and priority application are incorporated herein by reference.

BACKGROUND ART

The present disclosures relate to a server, a transfer method, and a non-transitory computer-readable storage medium therefor.

There are known printers equipped with a card interface in which a memory card is loaded, and configured to execute printing based on the number of sheets stored that can be printed stored in the memory card. The user of such a printer can cause the printer to perform printing for the number of sheets that can be printed stored in the memory card. The user can continue to use a printing service by purchasing the printable number of sheets.

In conventional printing services, printers need to be replaced when printers malfunction or when printer consumables are consumed. Thus, a problem arises as to how the printable number of sheets should be transferred from the old printer to the new printer.

DESCRIPTION

According to aspect of the present disclosures, there is provided a server configure to communicate with an information processing device and a recording device. The recording device includes a recording mechanism configured to perform a recording operation on a recording medium. The server includes a server memory capable of storing recording device identification information identifying the recording device and server-side recording permission information indicating a server-side permitted recording amount of recording by the recording mechanism in an associated manner. The server is configured to perform a transferring operation in response to receiving a transferring instruction from the information processing device, the transferring operation including storing server-side recording permission information, which is stored in the server memory in an associated manner with first recording device identification information identifying a first recording device, in the server memory in an associated manner with second recording device identification information identifying a second recording device.

Further, according to aspect of the present disclosures, there is provided a non-transitory computer-readable storage medium for an information processing device configured to communicate with a recording device and a server. The recording device comprises a recording mechanism configured to perform a recording operation on a recording medium. The server comprises a server memory capable of storing recording device identification information identifying the recording device and server-side recording permission information indicating a server-side permitted recording amount of recording by the recording mechanism in an associated manner. The non-transitory computer-readable recording medium contains computer-executable instructions, the computer-executable instructions being configured to, when executed by a controller of the information processing device, cause the information processing device to perform a transferring operation, the transferring operation including transmitting a transferring instruction to the server, the transferring instruction being an instruction to cause the server to store the server-side recording permission information, which is stored in the server memory in an associated manner with first recording device identification information identifying a first recording device, in the server memory in an associated manner with second recording device identification information identifying a second recording device.

Further, according to aspect of the present disclosures, there is provided a transfer method for a server configured to communicate with an information processing device and a recording device. The recording device includes a recording mechanism configured to perform a recording operation on a recording medium. The server includes a server memory capable of storing recording device identification information identifying the recording device and server-side recording permission information indicating a server-side permitted recording amount of recording by the recording mechanism in an associated manner. The transfer method comprises performing a transferring operation in response to receiving a transferring instruction from the information processing device, the transferring operation including storing server-side recording permission information, which is stored in the server memory in an associated manner with first recording device identification information identifying a first recording device, in the server memory in an associated manner with second recording device identification information identifying a second recording device.

FIG. 2 is an illustration of a printer management table.

FIG. 3 is an illustration of a server management table.

CONFIGURATION OF PRINTING SYSTEM 1

Figure 1:
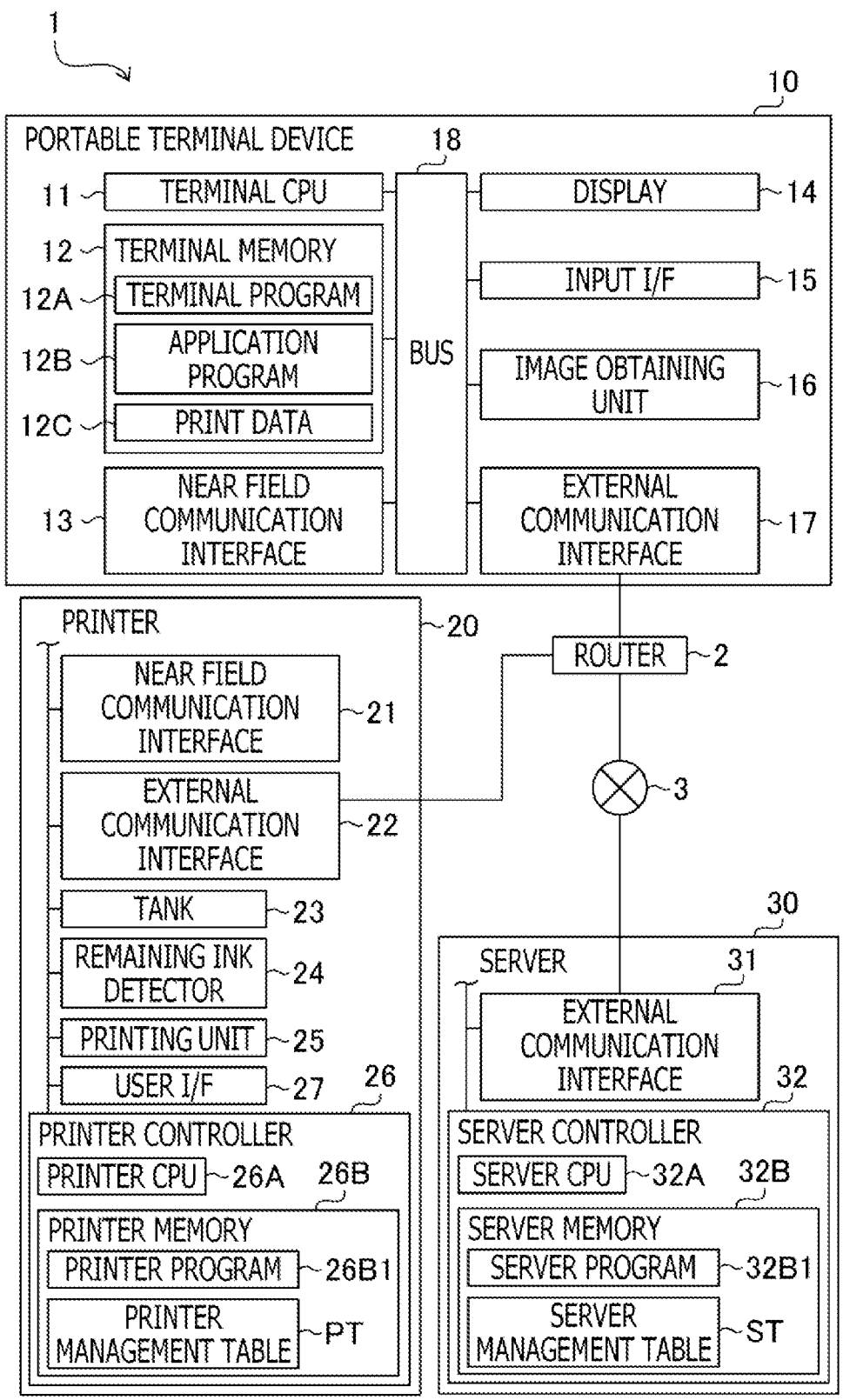
FIG. 1 is a configuration of a printing system according to an embodiment of the present disclosures.

FIG. 1 shows a configuration of a printing system 1 according to an embodiment of the present disclosures. The printing system 1 is used for a printing service which is provided to users. The printing service is a service that allows a user to print by charging the user for a "printable number of sheets" which is the number of sheets of paper that can be printed by a printer 20. The user pays an initial fee when applying for this printing service, which entitles the user to a particular number of sheets (e.g., 2,000 sheets) that is allowed to be printed. In the following description, setting the "printable number of sheets" or increasing the "printable number of sheets" by charging an additional fee may be referred to as "charging."

In the present embodiment, the printer 20 is, for example, an inkjet printer. The printer 20 sent to the user by a vendor is filled with the amount of ink necessary to print more than the particular "printable number of sheets" granted to the user (e.g., 2,000+a). Therefore, in this printing service, the user does not need to fill the printer 20 with ink or replace the ink cartridges after obtaining the printer 20 and before performing the printing by the "printable number of sheets" granted by paying the initial fee. Thus, this printing service eliminates the need to refill the printer 20 with ink, which is highly convenient for the user.

Further, if the user wishes to print more than the particular "printable number of sheets" granted by payment of the initial fee, the user is required to pay an additional fee. Then, by purchasing an additional "printable number of sheets", the user can continue to use the printer 20. If the user repeatedly purchases additional "printable number of sheets" and the remaining amount of the ink that the printer 20 obtained by the payment of the initial fee runs low, the user may apply for the replacement of the printer 20 and the printer 20 will be replaced, thereby the printing service will be continued. The number a above is set appropriately by the vendor providing the printing service.

The printing system 1 is provided with a portable terminal device 10, the printer 20, and a server 30. The portable terminal device 10 and the printer 20 are connected by a wired or a wireless connection (e.g., through a LAN), so as to be communicable with each other via a router 2. Further, the portable terminal device 10 and the server 30 are connected to each other so as to be communicable via the router 2 and the Internet 3. Further, the printer 20 and the server 30 are connected to each other so as to be communicable via the router 2 and the Internet 3. The above network configuration is only an example. That is, the server 30 may be arranged in the LAN. Further, there may be multiple portable terminal devices 10 and printers 20 connected to the server 30, and multiple portable terminal devices 10 may be connected to one printer 20. That is, there may be multiple portable terminal devices 10 that execute the printing and charging processes described below, and the printer 20 that executes the printing may be selected from among multiple printers 20.

Configuration of Portable Terminal Device 10

The portable terminal device 10 is configured to cause the printer 20 to perform printing of images on a printing sheet, which is an example of a recording medium according to aspects of the present disclosures. The portable terminal device 10 is, for example, a smartphone. The portable terminal device 10 has a terminal CPU 11, a terminal memory 12, a near field communication interface 13, a display 14, an input I/F (I/F being an abbreviation for interface) 15, an image obtaining unit 16, and an external communication interface 17. These components are configured to communicate with each other via a bus 18.

Figure 10:
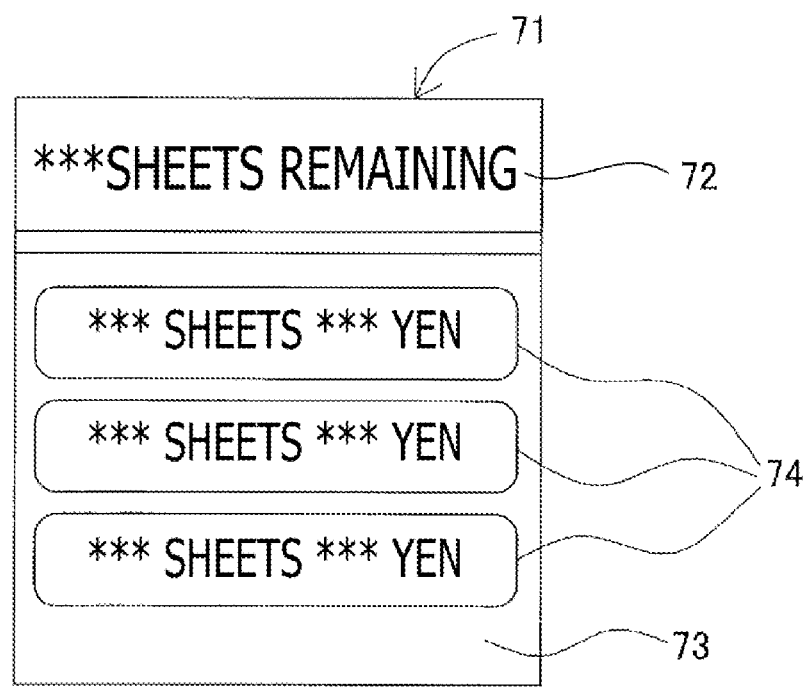
FIG. 10 is a figure indicating a charge screen displayed on the display.

The terminal memory 12 is configured, for example, with a combination of a RAM, a ROM, a flash memory, an HDD, a buffer provided to the terminal CPU 11, and the like. In the terminal memory 12, a terminal program 12A, an application program (hereinafter occasionally referred to as "application") 12B, and print data 12C are stored. The terminal program 12A is the program that integrally controls the portable terminal device 10 and provides basic functions and services to the application 12B. The terminal program 12A is, for example, an Android (registered trademark of GOOGLE LLC.) OS or iOS (registered trademark of CISCO). When the portable terminal device 10 is a PC, the terminal program 12A is, for example, Windows (registered trademark of Microsoft Corporation) OS. The application 12B is a program, for example, provided by the vendor of the printer 20, which uses the functions of the terminal program 12A and the like to execute various processes described below, such as a setting process for the printer 20, print instructions to the printer 20, and charge instructions to the server 30 and the like. The terminal CPU 11 executes the terminal program 12A and the application 12B to control the portable terminal device 10 and transmit commands to the server 30. The print data 12C is configured such that an image subjected to the printing process is converted into a data format that can be interpreted by the printer 20. The terminal memory is also used to store the printable number of sheets of the printer 20. As described below, the portable terminal device 10 is configured to store, for example, the printable number of sheets obtained from the server 30 in the terminal memory 12, and uses information on the stored printable number of sheets for displaying the charge screen 71 (printable number of sheets displaying area 72) in FIG. 10, for example.

In the following description, the portable terminal device 10 that executes the terminal program 12A or the application 12B on the terminal CPU 11 may be simply referred to by the name of the device. For example, a statement "the portable terminal device 10 does something" may mean "the portable terminal device 10 which executes the terminal program 12A or the application 12B with the terminal CPU 11 does something". The same applies further to the printer 20, which executes a printer program 26B1 with the printer CPU 26A, as described later, and to the server 30, which executes a server program 32B1 with the server CPU 32A.

The near field communication interface 13 communicates wirelessly with the printer 20 over a short distance. The near field communication interface 13 communicates wirelessly with a near field communication interface 21 of the printer 20, which is described below, using Bluetooth (registered trademark of Bluetooth SIG, Inc.) or NFC (abbreviation of Near Field Communication), for example. The display 14 is configured to display various types of information and can employ, but is not limited to, an LCD or an organic EL display. As an input OF 15, a touch panel integrally configured with the display 14 can be employed to receive user operations on icons, and the like displayed on the display 14.

The image obtaining unit 16 obtains, for example, images taken by a camera (not shown) equipped with the portable terminal device 10. The image obtaining unit 16 may be connected to an HDD or other device corresponding to an external device to obtain images. The images obtained by the image obtaining unit 16 are converted into print data 12C and stored in the terminal memory 12.

An external communication interface 17 is configured to transmit and receive data to and from the router 2, for example, through wireless communication in accordance with the communication standard of Wi-Fi (registered trademark of Wi-Fi Alliance). The external communication interface 17 is connected to the printer 20 via the router 2. Further, the external communication interface 17 is connected to the server 30 via the router 2 and the Internet 3. It is noted that the external communication interface 17 may be connected to the router 2 by a wired communication such as a LAN using a LAN cable.

Configuration of Printer 20

The printer 20 is, for example, a color printer according to an inkjet method. The printer 20 is provided with the near field communication interface 21, an external communication interface 22, a tank 23, a remaining ink detector 24, a printing unit 25, a user I/F 27 and a printer controller 26. The external communication interface 22 is configured to perform transmission/reception of signals with external devices (in the present embodiment, the portable terminal device 10 and the server 30) which are connected via the network. The tank 23 is configured to reserve ink. In the present embodiment, there are four kinds of ink (i.e., magenta (M), cyan (C), yellow (Y) and black (BK)), and multiple tanks 23 are provided for the multiple colors of ink, respectively. That is, the printer 20 uses multiple tanks 23, and the four types of ink are reserved in respective tanks 23 independently. In the present embodiment, when the printer 20 is supplied to the user by the vendor, each of the multiple tanks 23 is filled with ink sufficient to print a particular number of sheets when, for example, monochromatic coverage is assumed to be 5%. The particular number is the number that is greater than the printable number of sheets given to the user who applies for the printing service, and can be set arbitrarily by the vendor that provides the printing service.

Further, the tank 23 is arranged such that the user cannot fill the tank with ink. Concretely, the tank 23 is arranged at a position where the user cannot touch the tank 23. Further, the tank 23 is non-removably secured to the printer 20. The remaining ink detector 24 is configured to detect the amount of remaining ink, which is the remaining amount of ink stored in the tank 23. The remaining ink detector 24 includes an optical sensor arranged in the tank 23 and is configured to detect the remaining amount of ink by detecting the height of the liquid surface of the ink. The ink level detector 24 is arranged in each of the multiple tanks 23 and detects the amount of remaining ink in each of the multiple tanks 23. It should be noted that the printer 20 may be configured such that the tanks 23 are replaced by the user.

The printing unit 25 performs printing using ink stored in the tanks 23. The printing unit 25 performs a process to print images, such as print data 12C, on a sheet using a well-known inkjet printing method. The user I/F 27 is, for example, a touch panel, pushbutton switch, or the like, which is configured to receive an operation input by the user and to display various types of information. The printer controller 26 is configured to provide overall control of the printer 20. The printer controller 26 has a printer CPU 26A and a printer memory 26B. The configuration of the printer 20 described above is only an example. For example, the printer 20 may be configured not to have a user I/F 27 such as a touch panel.

The printer CPU 26A controls the operation of the printer 20 by executing a printer program 26B1 in the printer memory 26B. The printer program 26B1 is a program that integrally manages the printer 20 and causes the printer 20 to perform various processes. The printer memory 26B is configured, for example, with a combination of a RAM, a ROM, a flash memory, an HDD, and a buffer provided to the printer CPU 26A.

Further, a printer management table PT is stored in the printer memory 26B. The printer management table PT is a table that stores information about the printer 20 regarding the use of the printing service. The information stored in the printer management table PT is used as appropriate when various processes described below are executed. As shown in FIG. 2, the printer management table PT stores the device ID, the printable number of sheets, the remaining ink amount, activation information, a device setting, and the synchronization date and time.

The device ID is, for example, a serial number set by the vendor of the printer 20 and is unique information that can identify any printer 20 from any other printer 20. The device ID is not necessarily limited to a serial number, but can be, for example, a MAC address for wired or wireless of the near field communication interface 21 or external communication interface 22. The printable number of sheets indicates the number of sheets that can be printed by the printer 20. The user of the printer 20 can print only the printable number of sheets stored in the printer management table PT. As the user is charged, the printable number of sheets is increased (i.e., charged) by an amount corresponding to the fee charged to the user. Further, the printable number of sheets is decreased by the number of sheets used by the printer 20 for printing. Details on the addition and subtraction of the printable number of sheets will be described below.

The remaining ink amount indicates the remaining ink amount detected by the remaining ink detector 24. The printer 20 stores the remaining ink amount detected by the remaining ink detector 24 in the printer management table PT after performing operations using ink, such as refilling of ink, nozzle check, printing, and so on, for example. The printing by the printing unit 25 is allowed when the activation information indicates the ON state, and the printing by the printing unit 25 is restricted when the activation information indicates the OFF state. The restriction of printing means, for example, putting the printer 20 in a state where the printer 20 cannot perform printing with the printing unit 25. A symbol "O" in FIG. 2 and FIG. 3 indicates that the device is set to the "ON" state, while a symbol "X" indicates that the device is set to the "OFF" state. The device setting is setting information for representing functions of the printer 20 (the printing function and the like) and settings of the respective functions (the sheet size, color, magnification and the like), and the language and the like to be displayed on the user I/F 27. The synchronization date and time represents the date and time of the last (most recent) synchronization process with the server 30. The synchronization process here is, for example, the process of making the printable number of sheets coincide between the server 30 and the printer 20. It is noted that the synchronization process in the present embodiment is an example of an updating process according to the present disclosures. The updating process according to the present disclosures relates to information on a permitted amount for recording (e.g., the printable amount), such as the printable number of sheets and the number of sheets that have been printed (see FIG. 19 below), and includes a process of referring to the permitted amount for recording of one of the server 30 and the printer 20 and updating the permitted amount for recording of the other based on the communicating between the server 30 and the printer 20. Therefore, the updating process is not necessarily limited to a process in which both the server 30 and the printer 20 have the same information on the same printable number of sheets (i.e., a process to make the amounts coincide with each other), as in the synchronization process, but includes a process in which the printable number of sheets of the server 30 and the printer 20 match as a result of updating the information of one based on the other. Another embodiment is described in detail with reference to FIG. 19.

Configuration of Server 30

As shown in FIG. 1, the server 30 is equipped with an external communication interface 31 and a server controller 32. The external communication interface 31 is configured to execute communication with the portable terminal device 10 and the printer 20 connected via the network. The server controller 32 is configured to perform an overall control of the server 30. The server controller 32 has a server CPU 32A and a server memory 32B. The server CPU 32A is configured to control the operation of the server 30 by executing a server program 32B1 in the server memory 32B. The server program 32B1 is a program that integrally manages the server 30 and causes the server 30 to perform various processes.

The server memory 32B is configured, for example, with a combination of a RAM, a ROM, a flash memory, an HDD, and a buffer provided by a server CPU 32A. In the server memory 32B, a server management table ST is stored (FIG. 3). The server management table ST is a table that stores information necessary for using the printing service. The server management table ST stores information on each of the printers 20 that use the printing service, associated with the device IDs of the printers 20, and is managed by the vendor. The information stored in the server management table ST is used as appropriate when various processes described below are executed.

As shown in FIG. 3, the server management table ST stores the device ID, the printable number of sheets, activation information, replacement request information, and the scheduled charge number, in an associated manner. The device ID, the printable number of sheets, and the activation information are data the same as those stored in the printer management table PT described above, and the data in the printer management table PT and corresponding to the same device ID is stored.

In the present embodiment, the server 30 manages the printable number of sheets for each printer 20 by means of the server management table ST, in which the device ID is associated with the printable number of sheets for the multiple printers 20 using the printing service. The server 30 manages the latest printable number of sheets using the server management table ST by executing the synchronization process to synchronize the printable number of sheets of respective printers 20, which number increases or decreases according to each user's operation.

When set to ON, the replacement request information is indicates that the printer 20 has already been applied for replacement, and when set to OFF, the replacement request information indicates that the printer 20 has not yet been applied for replacement. The scheduled charge number is the printable number of sheets charged by the user and has not yet been reflected in the printer 20. It is noted that the replacement request information may be stored in the printer management table PT of the printer 20 for management.

Initial Device Setting Process

Figure 4:
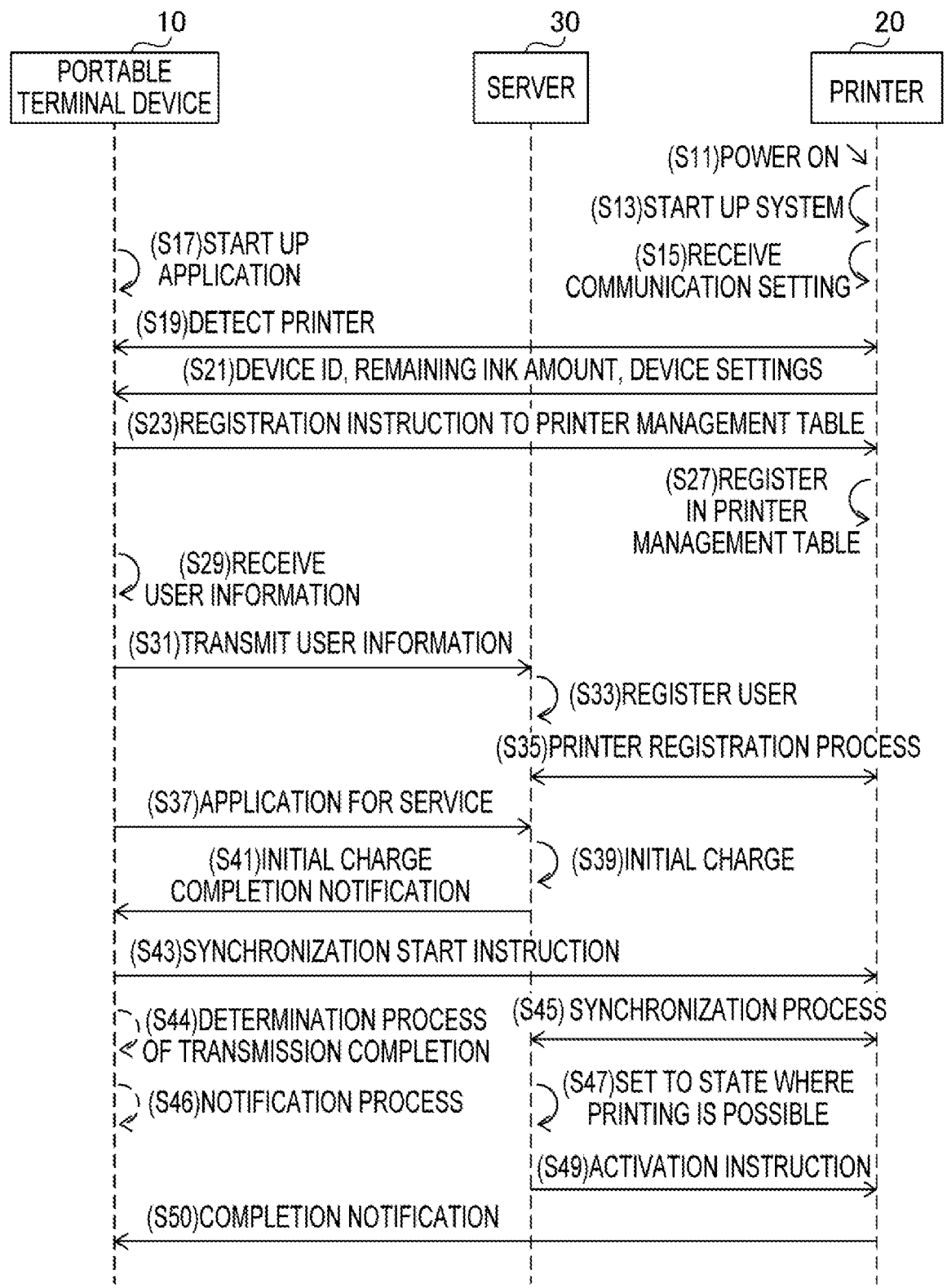
FIG. 4 is a sequence chart showing a case where an initial device setting process has been performed.

Next, tasks of the user and processes of each device in the initial device setting process of the printer 20 will be described. When the user first purchases the printer 20 and the printer 20 arrives from the vendor, the user performs tasks shown in FIG. 4. The portable terminal device 10, the printer 20, and the server 30 perform their respective processes according to the user's task. In FIG. 4 and subsequent sequence diagrams, tasks performed by the user are indicated by down left arrows. Further, the content and order of the processes and tasks shown in FIG. 4 and thereafter are examples. Further, a case in which a printer 20 with a device ID of "dv1" (see FIG. 2) is set as the printer 20 will be described.

First, in step (hereafter simply referred to as S) 11 in FIG. 4, the user powers on the printer 20 by operating the user I/F 27 (S11). When the printer 20 is powered ON, the printer 20 executes a printer program 26B1 with the printer CPU 26A to start up system of the printer 20 (S13). The printer 20 performs an initial installation, and the like, when the system is started up. The initial installation is, for example, a process to prepare for printing by the printing unit 25, such as filling the printing unit 25 with ink, checking for clogged nozzles, and so on. Further, the printer 20 detects the remaining ink amount in the printing unit 25 when the initial installation is completed. At this point, the remaining ink amount ink1 is almost full. Further, the printable number of sheets pr1 at this point is blank (i.e., no number being set) or zero. It is noted that the printer 20 may be configured to perform the initial installation, detection of the remaining ink amount, and the like, after the printable number of sheets pr1 has been set.

After executing the system startup, and the like, the printer 20 shifts to a state in which the printer 20 can receive a communication setting (S15). The printer 20 supplies electrical power to a near field communication interface 21 and an external communication interface 22, and shifts to a state in which the printer 20 is ready to communicate with external devices. On the other hand, when the portable terminal device 10 is powered on, for example, the portable terminal device 10 executes a terminal program 12A to start up the system, and then executes an application 12B in response to an operation input to the input I/F 15, and the like, to start up the application program (S17).

Furthermore, the user executes communication settings for the printer 20 and the portable terminal device 10 as appropriate. For example, when connecting the printer 20 and the portable terminal device 10 via the wireless communication according to the Wi-Fi (registered trademark of the Wi-Fi Alliance), the printer 20 receives the input of an SSID and/or encryption key of the router 2 via the touch panel of the user I/F 27 (S15). Based on the received SSID and encryption key, the printer 20 makes a connection with the router 2 via the wireless communication. Similarly, the portable terminal device 10 connects to the router 2 via the wireless communication based on the operation input to the input I/F 15. The portable terminal device 10 detects the printer 20 on the same network based on the startup of the application 12B and the particular operation input (such as the MAC address of the external communication interface 22) after the startup (S17), and becomes ready to communicate with the printer 20 via the wireless communication in accordance with the Wi-Fi (registered trademark of the Wi-Fi Alliance) (S19). Further, the printer 20 is in a state where the printer 20 can communicate with the server 30 through the router 2.

It is noted that, the method of connecting the printer 20 and the portable terminal device 10 to the router 2 is not necessarily limited to the method described above. For example, when connecting via a near field wireless communication according to the Bluetooth (registered trademark of BLUETOOTH SIG, INC.), the printer 20 shifts to the pairing mode (S15), in which pairing is performed by the near field communication interface 21, in response to a particular button operation of the user I/F 27 (such as a long press of any button). Further, with use of the OS function of the terminal program 12A, for example, in response to a particular operation input to the input I/F 15, the portable terminal device 10 executes a connection with the printer 20, using the near field wireless communication, via the near field communication interface 13 (S19). The particular operation input here is, for example, an operation to select the printer 20 retrieved through the Bluetooth communication. Then, the portable terminal device 10 may exchange the SSID and encryption key of the router 2 necessary for the Wi-Fi wireless communication connection with the printer 20 via the near field wireless communication, and execute the communication settings of the printer 20 according to the near field wireless communication connection.

The portable terminal device 10 displays, for example, a list of the printers 20 detected in S19 on the display 14 and receives the selection of the printers 20. When, for example, connecting to the selected printer 20 for the first time, the portable terminal device 10 requests for information on that printer 20 (S19). It is noted that, for example, the printer 20 that is to be connected for the first time is a printer 20 with which data such as print data 12C has never been exchanged in the past. The portable terminal device 10 is configured to store, for example, printer names and device IDs, with which the portable terminal device 10 has executed communications in the past, in the terminal memory 12. When connecting to a printer 20 whose data such as a printer name has not been stored in the terminal memory 12, the portable terminal device 10 may determine that it is the printer 20 that is being connected for the first time and request for information thereof.

Figure 5:
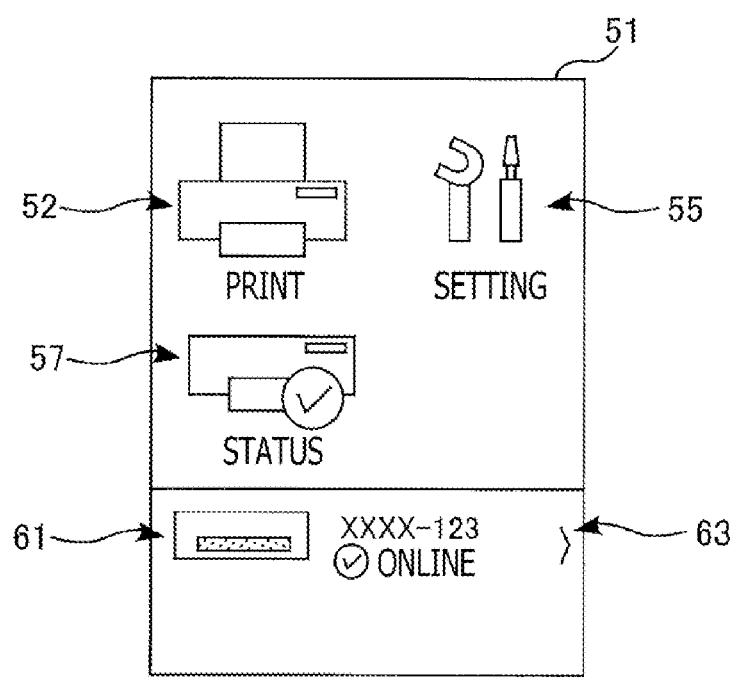
FIG. 5 is a figure indicating a menu screen to be displayed on a display of a portable terminal device.

When receiving a request for information from the portable terminal device 10, the printer 20 transmits the device ID "dv1," the remaining ink amount "ink1," and the device settings "dc1" to the portable terminal device 10 (S21). At a stage when the printer 20 is shipped from the vendor, the printer 20 does not have any data stored in the printer management table PT. The printer 20 is shipped with the device ID and device settings stored in the memory area, other than the printer management table PT, of the printer memory 26B. The printer 20 transmits the device ID and device settings stored in this printer memory 26B in S21. Further, the printer 20 transmits the remaining ink amount detected by the remaining ink detector 24. When receiving the device ID and other information in S21, the portable terminal device 10 displays a menu screen 51, shown in FIG. 5, on the display 14. The portable terminal device 10 displays, for example, a print icon 52 to instruct the printer 20 to perform a printing function, a setting icon 55 to perform settings for the printer 20, and a status icon 57 to check the status of the printer 20 on the menu screen 51.

The portable terminal device 10 displays information about the printer 20 selected in S19 on a printer information displaying area 61 provided at a lower part of the menu screen 51. The portable terminal device 10 displays, for example, a word "online" to indicate that it is now ready to communicate with the printer 20 on the printer information displaying area 61. When a selection button 63 on the printer information displaying area 61 is touched, the portable terminal device 10 displays a list of printer names (e.g., model numbers) of printers 20 detected on the same network, and receives the selection of the printer 20 for performing printing and/or other operations. Further, when the selection button 63 is touched, the portable terminal device 10 also displays in the list of the printers 20 to which the print instruction has been transmitted and printing has been executed in the past, as well as the printers 20 to which the charging process has been executed. If, for example, these printers 20 are offline or not on the same network, the portable terminal device 10 displays the names of the printers by adding text such as "offline" to distinguish the same from the printers 20 that are online. The portable terminal device 10 receives the selection of the printer 20 from this list of the printers 20 to perform the charging process described below (S111 in FIG. 9).

When the print icon 52 is touched in a state where any printer 20 is selected on the printer information displaying area 61, the portable terminal device 10 executes a print instruction directed to the printer 20. Further, when the setting icon 55 is touched, the portable terminal device 10 displays the device settings and the like, which are obtained from the printer 20. Further, when the status icon 57 is touched, the portable terminal device 10 displays status information such as the remaining ink amount obtained from the printer 20.

The portable terminal device 10 transmits a printer management table registration instruction to the printer to store each item to the printer management table PT (S23) in response to the receipt of the device ID and other information. In response to receipt of the instruction in S23, the printer 20 registers (stores) the device ID "dv1," the remaining ink amount "ink1" detected in S13, and the device setting "dc1" in the printer management table PT in an associated manner (S27). Further, the printer 20 maintains the printable number of sheets pr1 in the printer management table PT in a blank state, which is the state maintained after the initial installation. Further, the printer 20 sets the activation information in the printer management table PT to the OFF state. The printer 20 sets the synchronization date and time "cd1" to a blank status. In this way, the registration of the printer management table PT is completed. It is noted that, the printer 20 may have its device ID and device settings set in the printer management table PT when it is shipped from the vendor.

The portable terminal device 10 receives user information via the input I/F 15 in S29. The portable terminal device 10 performs reception of user information in S29, if, for example, the user registration for the application 12B is not yet registered or the user registration for the printer 20 is not yet registered. This user information is, for example, information about the logged-in user to log in to application 12B or about the user using the printer 20, such as a user ID, a password, the user's name, a user's address, a user's age, gender of the user, a user's occupation, a contact e-mail address, and a payment method for fees. It is noted that, the process of accepting user information is not necessarily limited to the initial device setting process. For example, registration of the user information may be performed before the initial device setting process (e.g., when the application 12B is started for the first time), or it may be performed when the charging process or replacing process described below is executed.

When receiving the user information in S29, the portable terminal device 10 transmits the received user information to the server 30 (S31). When obtaining the user information from the portable terminal device 10, the server 30 stores the obtained user information in the server memory 32B (S33). In this way, the information of the user using the printer 20 is registered with the server 30. The server 30 may manage the user information separately from the server management table ST, or manage the same by associating with a device ID in the server management table ST.

When completing the registration of the printer management table PT by executing S27, the printer 20 accesses the server 30 and executes the registration process (S35). The printer 20 accesses, for example, a URL of the server 30 which has been stored in the printer memory 26B in advance. When succeeding to access the server 30, the printer 20 becomes ready to communicate with the server 30 (S35). Further, the printer 20 transmits commands asking registration of, for example, the device ID, the printable number of sheets, and the activation information to the server 30. The server 30 compares the received device ID with the vendor's serial numbers registered in advance, and when a matching device ID is detected, the server 30 registers the received device ID and relevant information in the server management table ST (S35). It is noted that, the printer 20 may obtain information on the access destination of the server 30 from the portable terminal device 10. Further, the printer registration process (S35) may be performed by the portable terminal device 10.

After the completion of the registration of the user information in S29, the user performs an application for the service (S37). The user operates, for example, the input I/F 15 to perform registration of the registered user information, the information on the printer 20 selected in S19, and the method of paying the fee for the selected printer 20, and the like, to the server 30. The method of paying the fee may be selected from the methods of paying registered in S31, or information of a credit card or the like may be newly registered. In this way, the user information, the method of paying and the information of the printer 20 subjected to the charge (e.g., the device ID) are associated with each other and registered with the server 30.

The server 30 charges a particular printable number of sheets (e.g., 2000 sheets) to the printer 20 that is registered for the first time in the server management table ST as the initial charge (S39). For example, the server 30 may automatically charge a particular number of sheets for the first time to a user who has completed the service application according to S37, and for the printable number of sheets associated with the device ID of the printer 20 that has been registered in the server management table ST for the first time. Alternatively, the server 30 may confirm with the user via the portable terminal device 10 whether the initial charge is performed (S39). When the server 30 completes the initial charging process, the server 30 transmits a charge completion notification to the portable terminal device 10 (S41). It is noted that, the printable number of sheets for the initial charge may be set in the printer management table PT at the time the vendor ships the printer 20 to the user.

When receiving the completion notification issued in S41, the portable terminal device 10 transmits a synchronization start instruction to the printer 20 to synchronize the printable number of sheets of the initial charge with the server 30 (S43). It is noted that, the portable terminal device 10 may indicate the receipt of the completion notification on the display 14, and then cause the printer 20 to perform the synchronization or receive an instruction from the user.

When receiving the instruction to start synchronization in S43, the printer 20 executes a process to synchronize the printable number of sheets with the server 30 (S45). The printer 20, for example, queries the server 30 for the printable number of sheets charged in the initial charge in S39. The server 30 responds to the printer 20 with the first charged printable number of sheets based on the device ID. The printer 20 overwrites the printable number of sheets in the printer management table PT with the printable number of sheets obtained from the server 30, thereby synchronizing the printable number of sheets. When completing the synchronization process, the printer 20 updates the synchronization date and time "cd1" in the printer management table PT to the current date and time. It is noted that, the condition for starting the synchronization process in S45 is not necessarily limited to the transmission of the synchronization start command from the portable terminal device 10 to the printer 20 as described above. For example, the printer 20 may initiate the synchronization process based on a particular operational input to the input I/F 15.

After completing the synchronization process in S45, the server 30 makes settings to shift the printer 20 to a state in which printing is possible (S47). In the server management table ST, the server 30 sets the activation information associated with the device ID of the printer 20 for which the initial charge was completed in S39 to the ON state ("O" in FIG. 3). After updating the activation information in the server management table ST, the server 30 transmits an activation instruction, to the printer 20, which turns the activation information ON (S49). When receiving the activation instruction in S49 from the server 30, the printer 20 turns ON the activation information in the printer management table PT of its own device. In this way, the printer 20 becomes ready to print the print data 12C, and the like received from the portable terminal device 10. It is noted that, the server 30 is set to the OFF state as the initial value of the replacement identification information in the server management table ST.

After turning the activation information ON, the printer 20 transmits a completion notification to the portable terminal device 10 (S50). When receiving the completion notification transmitted in S50, the portable terminal device 10 displays, on the menu screen 51, for example, that the printer 20 is ready for printing. It is noted that, the contents of the initial device setting process shown in FIG. 4 above is only an example. For example, when the user does not plan to charge an additional printable number of sheets to the printer 20, the user does not need to register the user information, the credit card, or the like. In such a case, only the printable number of sheets of the initial charge may be charged to the printer 20. Further, when the initial device setting process for the replaced printer 20 described below is executed, it is not necessary to register the user information or perform the initial charge. Further, the printer 20 may be charged with a printable number of sheets for the initial charge at the time when the printer 20 is shipped from the vendor or the manufacturing plant. Furthermore, the server 30 may set the printable number of sheets to the printer 20 at a particular timing, for example, when the server 30 is first connected by the printer 20 and registered in the server management table ST, regardless of the charging action.

The portable terminal device 10 may determine whether the synchronization start instruction transmitted in S43 has been successfully transmitted to the printer 20 (S44). When the completion notification of S50 is not received when a particular time has elapsed after transmitting the instruction of S43, the portable terminal device 10 may determine that the synchronization start instruction has not been transmitted. When, for example, the user is outside the network range of the LAN, it would be difficult for the portable terminal device 10 to transmit the synchronization start command to the printer 20. It would also be difficult to transmit the synchronization start instruction when the printer 20 is turned off. The portable terminal device 10 may, for example, perform a notification process to inform the user of the need to perform an operation on the printer 20 to initiate the synchronization process when the completion notification of S50 cannot be received (S46). For example, the portable terminal device 10 may display text on the touch panel of the user I/F 27, such as "Long-Press the pushbutton switch on the printer 20 for 3 seconds to execute the synchronization process. Then, the printer 20 may perform the synchronization process again in response to a 3-second press against the pushbutton switch.

Printing Process

Next, the printing process performed by the portable terminal device 10 will be described with reference to a flowchart shown in FIG. 6. The printing process is a process that causes the printer 20 to perform printing.

In S51, the portable terminal device 10 determines whether a printing execution operation has been performed. The print execution operation is an operation by the user to the print icon 52 on the menu screen 51. In response to the print execution operation (S51: YES), the number of sheets to be used for printing, and the like are designated on the print execution screen (not shown) that is displayed on the display 14. Hereafter, the number of sheets designated on the print execution screen is described as the number of sheets designated for printing.

When the print icon 52 is not operated, the portable terminal device 10 makes a negative determination in S51 (S51: NO) and repeats S51. On the other hand, the portable terminal device 10 obtains the printable number of sheets and activation information from the printer 20 (S53) in response to the print icon 52 being operated (S51: YES). Next, in S55, the portable terminal device 10 determines whether the printable number of sheets obtained in S53 is greater than or equal to the number of sheets designated for printing. When the printable number of sheets is less than the number of sheets designated for printing (S55: NO), the portable terminal device 10 terminates the printing process (S57). In such a case, a prompt to charge the printable number of sheets (i.e., a charging process: described below) is displayed on the display 14. On the other hand, when the printable number of sheets is greater than or equal to the number of sheets designated for printing (S55: YES), the portable terminal device 10 determines whether the activation information obtained in S53 is "ON" (S59). It is noted that, the determination of the printable number of sheets and the number of sheets designated for printing may be performed by a device other than the portable terminal device 10, such as the printer 20. For example, the portable terminal device 10 may transmit a print instruction without requesting the printable number of sheets in S73 and without conducting a comparison with the number of sheets designated for printing. Then, the printer 20 may stop printing when the printable number of sheets is less than the number of sheets designated for printing in the print instruction received from the portable terminal device 10.

The portable terminal device 10 terminates the printing process in S57 in response to the activation information being in the OFF state (S59: NO). In such a case, since the activation information is in the "OFF" state, a prompt for performing the initial device setting process is displayed on the display 14. In S65, the portable terminal device 10 transmits the print instruction to the printer 20 and causes the printer 20 to execute printing. The print instruction information is information about the print settings designated by the user's print execution operation, concretely, information such as print data 12C, the number of sheets designated for printing, color tone and the like.

Next, in S67, the portable terminal device 10 determines whether printing is completed or not. Until the printing completion notification is received from the printer 20, the portable terminal device 10 makes a negative decision in S67 (S67: NO), and upon receiving the printing completion notification (S67: YES), the portable terminal device 10 obtains the printable number of sheets from the printer 20 (S69). When performing printing, the printer 20 decreases the printable number of sheets according to the number of sheets printed. When receiving the printing completion notification, the portable terminal device 10 obtains the printable number of sheets after deduction from the printer 20, updates the information in the terminal memory 12, and then terminates the process shown in FIG. 6. For example, the portable terminal device 10 uses the obtained updated information as the printable number of sheets displayed in response to the operation of the status icon 57 on the menu screen 51 and the printable number of sheets on the printing screen displayed in response to the operation of the print icon 52. It is noted that, in response to the printing completion notification, the portable terminal device 10 may obtain and update other information such as information on the remaining ink amount from the printer 20. Further, the portable terminal device 10 may not need to obtain information such as the printable number of sheets, and the like from the printer 20. For example, the portable terminal device 10 may obtain information on the printable number of sheets from the server 30 and display the same.

Operation of Printing System in Printing Process

Figure 7:
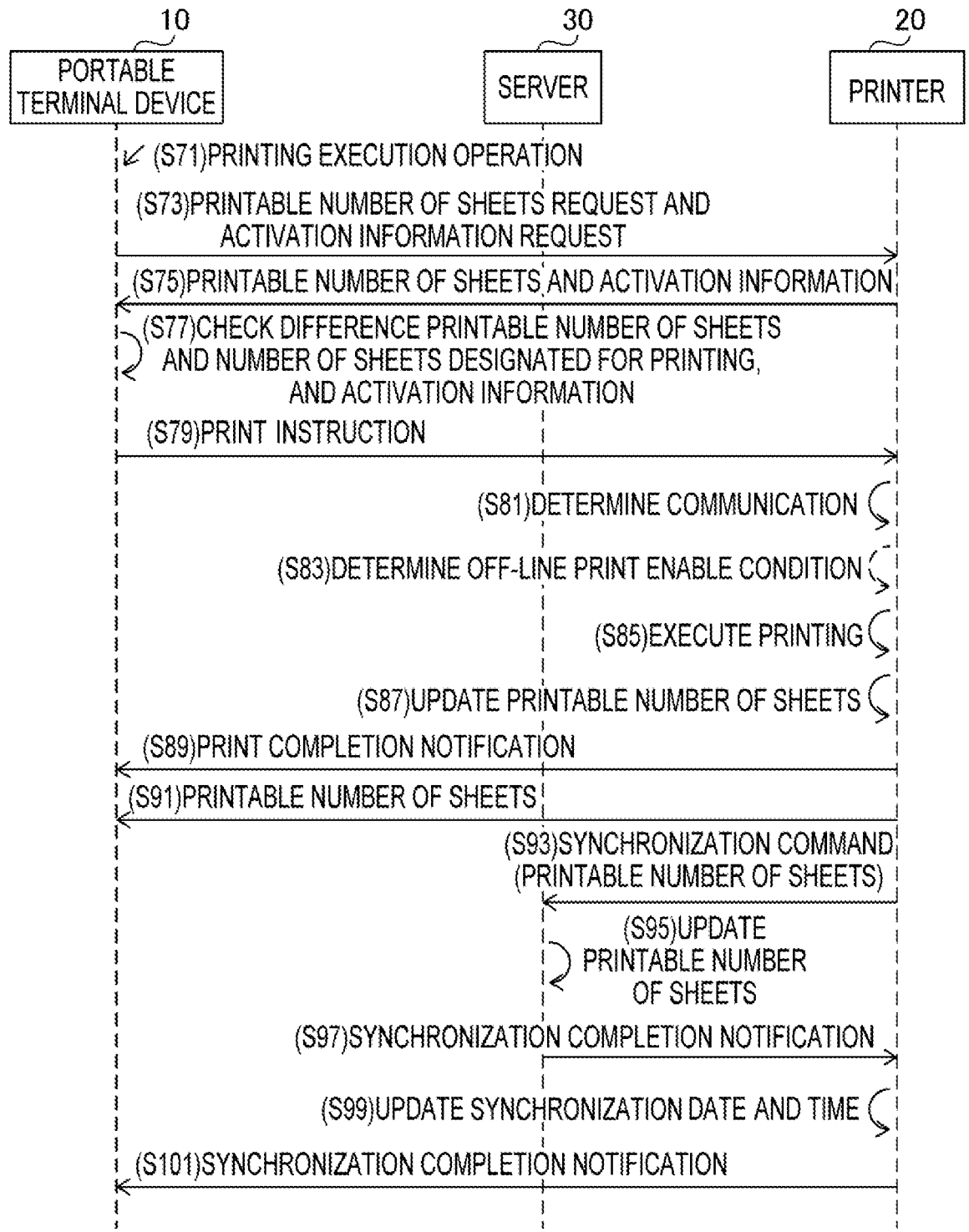
FIG. 7 is a sequence chart showing a case where the printing process illustrated in FIG. 6 is performed.

Next, the operation of the printing system 1 in the printing process described above is explained referring to FIG. 7. As an example, a case is described in which the printable number of sheets is sufficient in comparison with the number of sheets designated for printing, and the activation information is turned ON.

Figure 6:
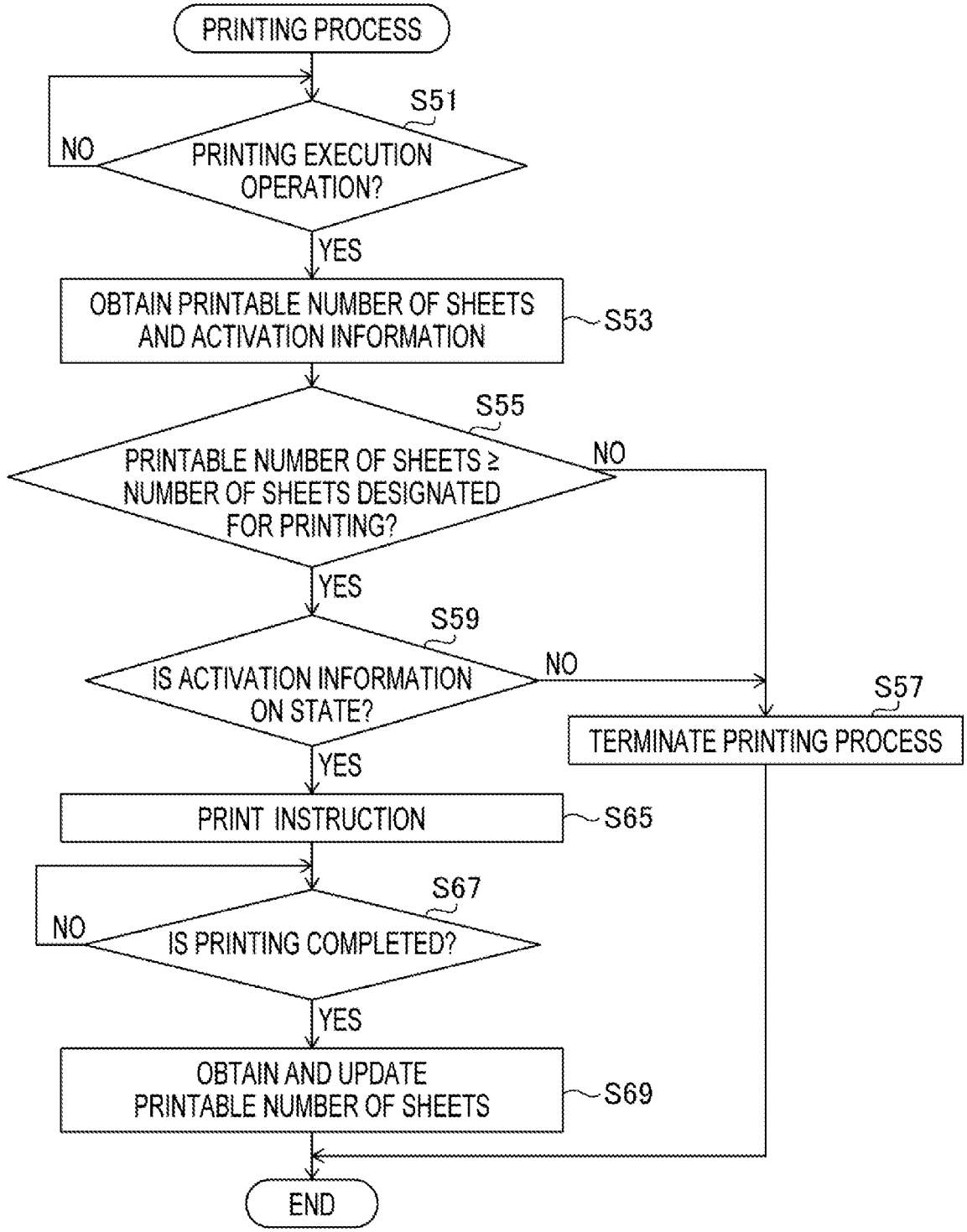
FIG. 6 is a flowchart illustrating a printing process performed by the portable terminal device.

In S71, the portable terminal device 10 receives the printing execution operation by the user (YES in S51 of FIG. 6). In S73, the portable terminal device 10 transmits a printable number of sheets request to obtain the printable number of sheets and an activation information request to obtain the activation information in response to the reception of the print execution operation.

In S75, the printer 20 transmits the printable number of sheets and activation information stored in the printer management table PT in response to the requests from the portable terminal device 10. In S77, in response to obtaining the printable number of sheets and activation information from the printer 20 (S53 in FIG. 6), the portable terminal device 10 checks the printable number of sheets and activation information (S55, S59 in FIG. 6). In S79, the portable terminal device 10 transmits a print instruction to the printer 20 (S65) in response to the printable number of sheets being greater than or equal to the number of sheets designated for printing (S55: YES) and the activation information being ON (S59: YES). For example, the portable terminal device 10 transmits the print data 12C and instructs the printer 20 to print the print data 12C. It is noted that, the portable terminal device 10 does not need to determine whether the printable number of sheets is greater than or equal to the number of sheets designated for printing, or whether the activation information is on or not. For example, the printer 20 may determine the printable number of sheets, and the like, and notify the portable terminal device 10 of the error.

In S81, the printer 20 determines whether the printer 20 is capable of communicating with the server 30. If the printer 20 is unable to communicate with the server 30 due to, for example, a failure of the router 2, a change in network settings, or a malfunction of the server 30, the printer 20 cannot synchronize the printable number of sheets with the server 30. In the printing system 1, the server 30 manages the printable number of sheets in association with the device ID, so allowing the printer 20 to print while communication is disabled is undesirable because unauthorized use may occur. On the other hand, uniformly prohibiting the printers 20 from printing in the event of a network failure, or the like, as described above, may lead to a decrease in usability.

When the printer 20 according to the present embodiment has determined, in S81, to be communicable with the server 30 (S81: YES), the printer 20 controls the printing unit 25 to perform printing. When completing the execution of the printing, the printer 20 updates the printable number of sheets in the printer management table PT (S87). Concretely, the printer 20 subtracts the number of sheets used for the printing from the printable number of sheets. In response to completion of the printing, the printer 20 transmits a print completion notification indicating the completion of the printing to the portable terminal device 10 (S89).

When the printer 20 has determined not to communicate with the server 30 (S81: NO), the printer 20 determines whether an off-line print enable condition is satisfied (S83). The off-line print enabling condition is a condition of allowing the printing even in an off-line state in which the printer 20 cannot communicate with the server 30. When determining that the off-line print enabling condition is satisfied (S83: YES), the printer 20 executes the printing in S85 as in a case where the positive decision is made in S81, and performs processes in S87 onwards. It is noted that the printer 20 may not examine the off-line print enabling condition in S83. For example, the printer 20 may execute the printing within a range of the printable number of sheets regardless whether the printer 20 is communicable with the server 30.

The off-line print enabling condition is, for example, the upper limit of the number of sheets to be printed in the off-line sates. In this case, the printer 20 makes a positive determination in S83 until the number of sheets on which printing is performed in the off-line state reaches the upper limit of the number of sheets even when a negative decision is made in S81. Alternatively, the off-line print enabling condition is a threshold of the duration time of the off-line state. In such a case, the printer 20 may make a positive decision until the duration time of the off-line state reaches the threshold even when a negative decision is made in S81.

When transmitting the print completion notification in S89, the printer 20 transmits the printable number of sheets after the update in S87 to the portable terminal device 10 (S91). Further, the printer transmits a synchronization command to synchronize the printable number of sheets to the server 30 (S93). The printer 20 transmits the printable number of sheets updated in S87, that is, the printable number of sheets after decreased in the printing process to the server 30. It is noted that, when the printer 20 is in a state where the printer 20 cannot communicate with the server 30, the printer 20 may re-transmit the synchronization command to the server 30 after waiting for a particular time period.

When receiving the synchronization command from the printer 20, the server 30 updates (overwrites) the printable number of sheets corresponding to the device ID of the printer 20 that is a transmission source with the received printable number of sheets on the server management table ST (S95). As a result, the printable number of sheets in the server management table ST coincides with the printable number of sheets of the printer 20 after execution of the printing. When completing the updating process of S95, the server 30 transmits a notification indicating the completion of the update to the printer 20 (S97). Upon receipt of the completion notification of S97, the printer 20 updates the synchronization date and time in the printer management table PT to the current date and time (S99). After updating the synchronization date and time, the printer 20 transmits a notification indicating the completion of the synchronization to the portable terminal device 10 (S101).

It is noted that the content of the printing process described above is only an example. The printer 20 may perform the synchronization process of the printable number of sheets every time when printing on one sheet is performed, or when multiple print jobs are received collectively, the printer 20 may perform the synchronization process after all the multiple print jobs are completed. Further, the printer 20 may perform the synchronization process of the printable number of sheets via the portable terminal device 10. For example, when the printer 20 cannot communicate with the server 30, the printer 20 may transmit a command requesting the synchronization with the printable number of sheets to the portable terminal device 10. Then, in response to the receipt of such a command from the printer 20, the portable terminal device 10 may perform the synchronization process of the printable number of sheets with the server 30. Further, when the printer 20 is unable to communicate with the server 30, the printer 20 may perform printing based on the print instructions from the portable terminal device 10 during the off-line print enabling condition is satisfied.

Non-Printing Time Synchronization Process

Figure 8:
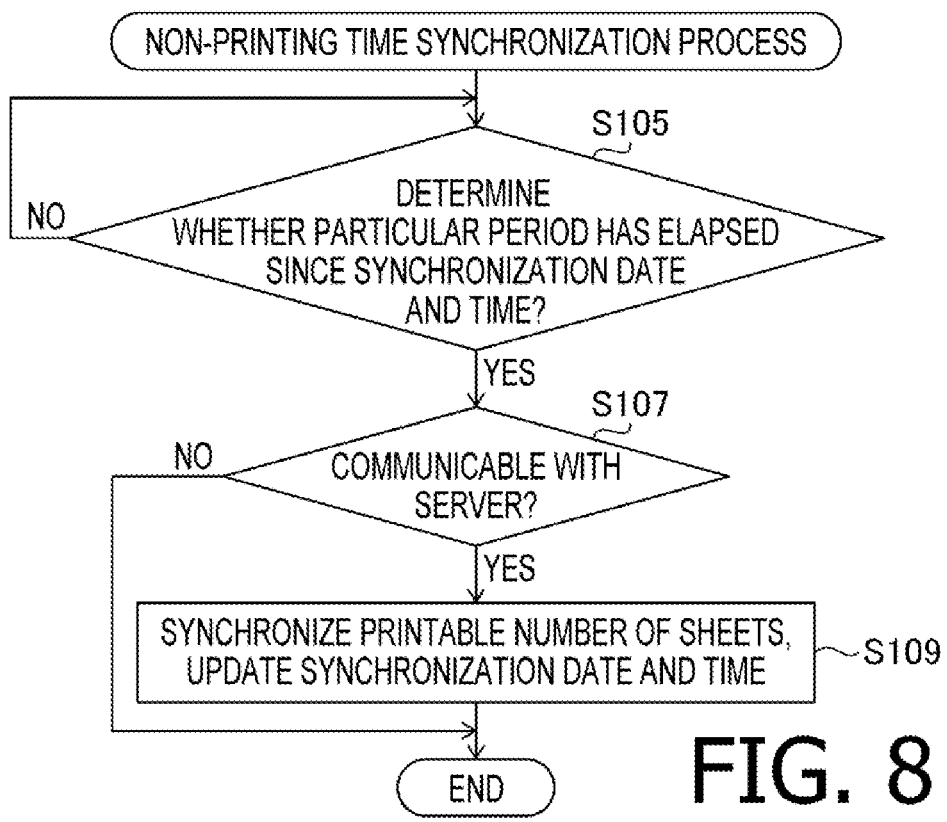
FIG. 8 is a flowchart illustrating a non-printing-time synchronization process performed by the printer.

Next, a non-printing time synchronization process performed by the printer 20 will be described referring to a flowchart shown in FIG. 8. The non-printing time synchronization process is a process, performed by the printer 20, to synchronize the printable number of sheets between the printer 20 and the server 30. When, for example the activation information in the printer management table PT is set to the ON state, the printer 20 performs, when in the powered ON state, the non-printing time synchronization process shown in FIG. 8.

When the non-printing time synchronization process is started, the printer 20 determines whether a particular period has elapsed since the synchronization date and time of the printer management table PT in S105. The particular period is a period during which the synchronization process is executed repeatedly, and is, for example, tens of minutes or several hours. The printer 20 repeatedly executes the determining process of S105 in a case where the particular period has not elapsed since the synchronization date and time of the printer management table PT (S105: NO).

When it is determined that the particular period has elapsed since the synchronization date and time (S105: YES), the printer 20 determines whether the printer 20 is communicable with the server 30 (S107). For example, the printer 20 accesses a particular URL of the server 30 and determines that the communication can be possible when the access is successful (S107: YES). Alternatively, the printer 20 may transmit data checking whether the communication is available to the server 30, and determines whether the communication is possible based on a response from the server 30. When the printer 20 can communicate with the server 30 (S107: YES), the printer 20 performs the synchronization process regarding the printable number of sheets with the server 30. Similar to S93 of FIG. 7, the printer 20 notifies the server 30 of the printable number of sheets in the printer management table PT, thereby updating the printable number of sheets in the server management table ST. As the synchronization process has been performed, the printer 20 updates the synchronization date and time of the printer management table PT to the current date and time. After terminating the process shown in FIG. 8, the printer 20 performs the processes from S105 onwards again. When the printer 20 cannot communicate with the server 30 (S107: NO), the printer 20 terminates the process shown in FIG. 8, and performs the processes from S105 onwards again. Thereafter, when the synchronization process has not been performed for a particular period of time, the printer 20 makes a positive decision in S105 and performs the synchronization process.

It is noted that the non-printing time synchronization process described above is only an example. The server 30 may be configured to take an initiative in performing the synchronization process. The server 30 may maintain a state where a particular communication port (e.g., a TCP high port) keeps a continuous connection with the printer 20, execute a periodical communication to the printer 20, thereby performing the synchronization process of the printable number of sheets. For example, the server 30 may inquire the printer 20, at every particular period, whether the synchronization process can be performed, and may perform the synchronization process with the printer 20 in response to the receipt indicating the synchronization process can be performed. Similar to the synchronization process of the printer 20, the server 30 may update the printable number of sheets in the server management table ST by obtaining the printable number of sheets from the printer 20 when a certain period of time has elapsed since the last synchronization process as the synchronization date and time. In this case, when the printer 20 is performing or scheduled to perform printing with the printing unit 25 when the inquiry is received from the server 30, the printer 20 may not perform the synchronization process until the printing is completed. For example, the printer 20 may respond to the server 30 that the printer 20 cannot perform the synchronization process when receiving the inquiry from the server 30 during printing, or the printer 20 may respond to the server 30 that the printer 20 can perform the synchronization process after printing is completed.

The printer 20 may perform the synchronization process based on an operation input by the user. For example, the printer 20 may perform the processes in S107 onwards of FIG. 8 based on the particular operation input (e.g., a long-press of the power button) to the user I/F 27. The portable terminal device 10 may transmit an instruction to perform the synchronization process to the printer 20 based on a particular operational input to the application 12B. The printer 20 may start the non-printing synchronization process of FIG. 8, for example, based on receipt of a command to start the synchronization process from the portable terminal device 10. In such a case, after transmitting the instruction for synchronization processing, the portable terminal device 10 may determine whether the instruction could be transmitted or not, as in S44 and S46 in FIG. 4, and if not, the portable terminal device 10 may display a message on the display 14 prompting the user to perform a particular operation, and the like on the user I/F 27. The printer 20 does not have to perform the non-printing synchronization process shown in FIG. 8. For example, the printer 20 may perform the synchronization process with the server 30 at least one of timings of the above particular operational input, before starting printing, after completing printing, when the power is turned on, or when returning from a power-saving mode. The printer 20 may shift to the power-saving mode to save power by limiting some of the printer 20 functions (e.g., non-display of the touch panel of the user I/F 27) when, for example, no operation input or a print instruction is received for a certain period of time. Then, in the power-saving mode, when receiving an operation input or the print instruction, the printer 20 may return to the normal state from the power-saving mode and perform synchronization processing when the printer 20 returns to the normal state.

Charging Process

Next, referring to the flowchart shown in FIG. 9, the charging process performed by the portable terminal device 10 will be described. The charging process is the process of increasing the printable number of sheets in response to being charged for the printable number of sheets by the user. The charging process can be performed on a charge screen 71 shown in FIG. 10. The charge screen 71 has a printable number of sheets displaying area 72 and a charge number displaying area 73. The printable number of sheets displaying area 72 is arranged on an upper side of the charge screen 71 and displays the printable number of sheets. As the printable number of sheets, the number obtained, for example, from the server management table ST of the server 30 and stored in the terminal memory 12 can be used. It is noted that, the portable terminal device 10 may obtain the printable number of sheets from the printer 20, store the same in the terminal memory 12, and use the same for displaying the printable number of sheets on the displaying area 72. The charge number displaying area 73 is arranged on a lower side of the charge screen 71 and displays multiple charge icons 74 in a list format. Each of the multiple charge icons 74 shows the number of sheets that differ from each other and the amount of the charge based on the number of sheets.

Returning to FIG. 9, the charging process will be described. In S111, the portable terminal device 10 executes a charge screen display process. For example, after the selection button 63 is operated on the menu screen 51 in FIG. 5, the portable terminal device 10 displays a list of the names of the printers 20 on the same network or the printers 20 with which the printing and charging processes were performed in the past (with which the portable terminal device 10 has communicated), and receives the selection of the printer 20 to execute the charging process. For example, the portable terminal device 10 may store historical information in the terminal memory 12 about the printers 20 that have performed printing, or the like in the past. When an icon for charging (not shown) is selected on a screen that is displayed after the status icon 57 is operated on the menu screen 51 in FIG. 5, with any printer 20 selected from the list, the portable terminal device 10 displays the charge screen 71 on the display 14. It is noted that, the program that displays the charge screen 71 or performs the charging process shown in FIG. 9 may be a program different from the application program that displays the menu screen 51 or performs the printing process, and the like, described above.

In S113, the portable terminal device 10 obtains the printable number of sheets stored in the printer management table PT and executes the printable number of sheets display process to display the obtained printable number of sheets on the printable number of sheets displaying area 72. Next, the portable terminal device 10 determines whether a charging operation has been performed (S115). The charging operation is an operation by the user to the charge icon 74. In response to the user's operation of any charge icon 74, the portable terminal device 10 determines YES in S115 and executes a printable number of sheets setting process in S117. It is noted that, the portable terminal device 10 does not have to display the printable number of sheets on the charge screen 71. In such a case, the portable terminal device 10 does not need to obtain the printable number of sheets from the printer 20.

The printable number of sheets setting process is a process that causes the server 30 to add the number of sheets displayed on the charge icon 74 operated by the user (hereinafter referred to as the charge number) to the printable number of sheets stored in the server management table ST. Further, the increased printable number of sheets is reflected in the printer management table PT of the printer 20 through the synchronization process.

At a stage where the printer 20 accepted on the charge screen 71, that is, at a stage where the menu screen 51 is displayed, the portable terminal device 10 transmits, to the server 30, permitted amount setting information for adding the charge number to the printable number of sheets of the server management table ST corresponding to the device ID of the printer 20 selected on the printer information displaying area 61 (see FIG. 5) (S117). When the portable terminal device 10 receives the charge completion notification from the server 30 to the effect that the synchronization of the printable number of sheets after addition has been completed (S119), the charging process shown in FIG. 9 is completed. The portable terminal device 10, for example, turns off the charge screen 71 on the display 14 and displays the menu screen 51.

Operation of Printing System in Charging Process

Figure 11:
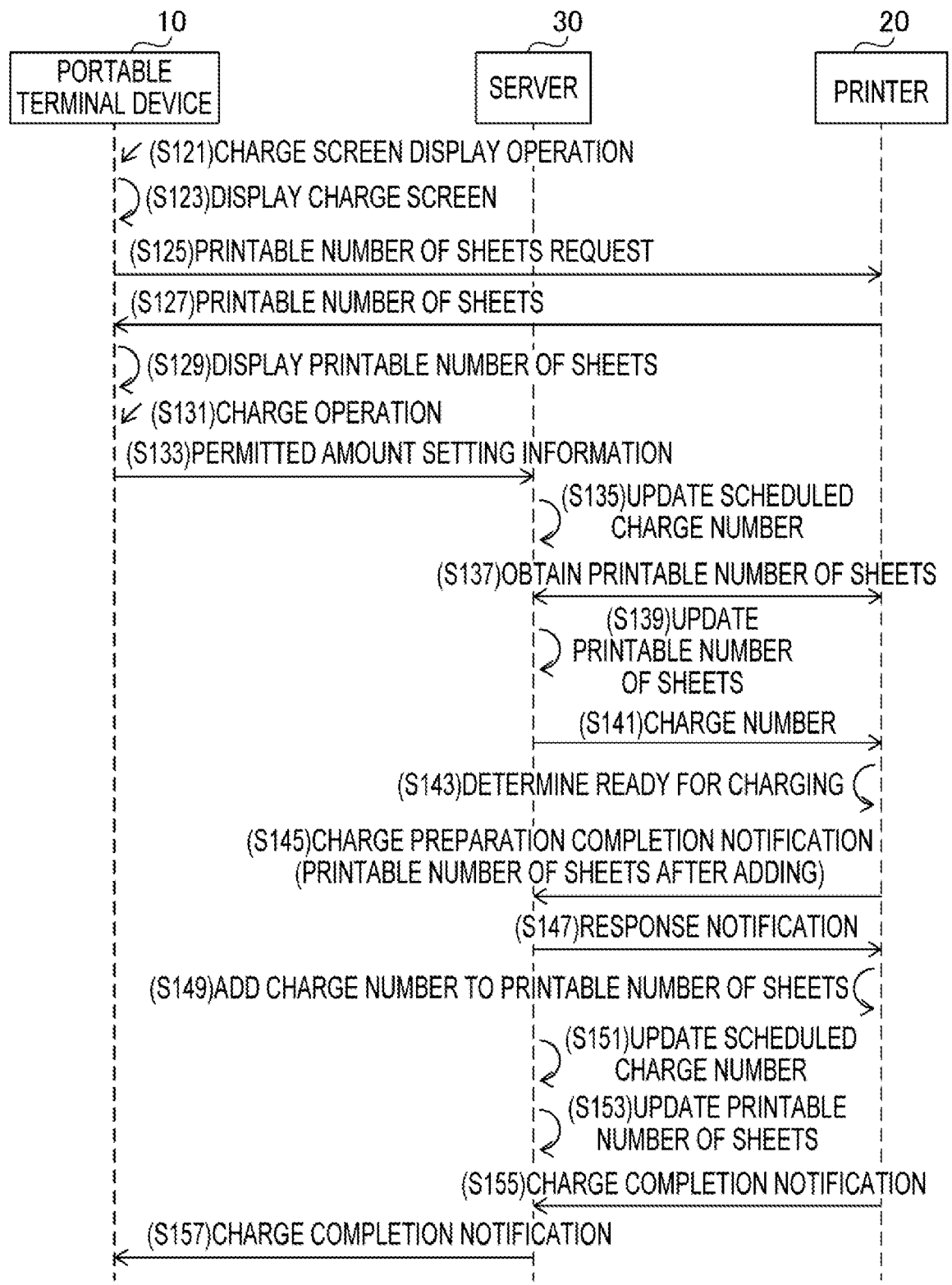
FIG. 11 is a sequence chart showing a case where the charging process shown in FIG. 9 is performed.

Next, an operation of the printing system 1 when the charging process described above is executed is described from the state in which the menu screen 51 is displayed, using the sequence diagram shown in FIG. 11. The portable terminal device 10 receives an operation to display the charge screen 71 on the menu screen 51 (S121). The portable terminal device 10 displays the charge screen 71 (S123, S111 in FIG. 9) and transmits a printable number of sheets request to the printer 20 (S125). In response to receiving the printable number of sheets request, the printer 20 transmits the printable number of sheets stored in the printer management table PT to the portable terminal device 10 (S127). In response to receiving the printable number of sheets, the portable terminal device 10 displays the printable number of sheets on the printable number of sheets displaying area 72 (S129, S113 in FIG. 9).

Figure 9:
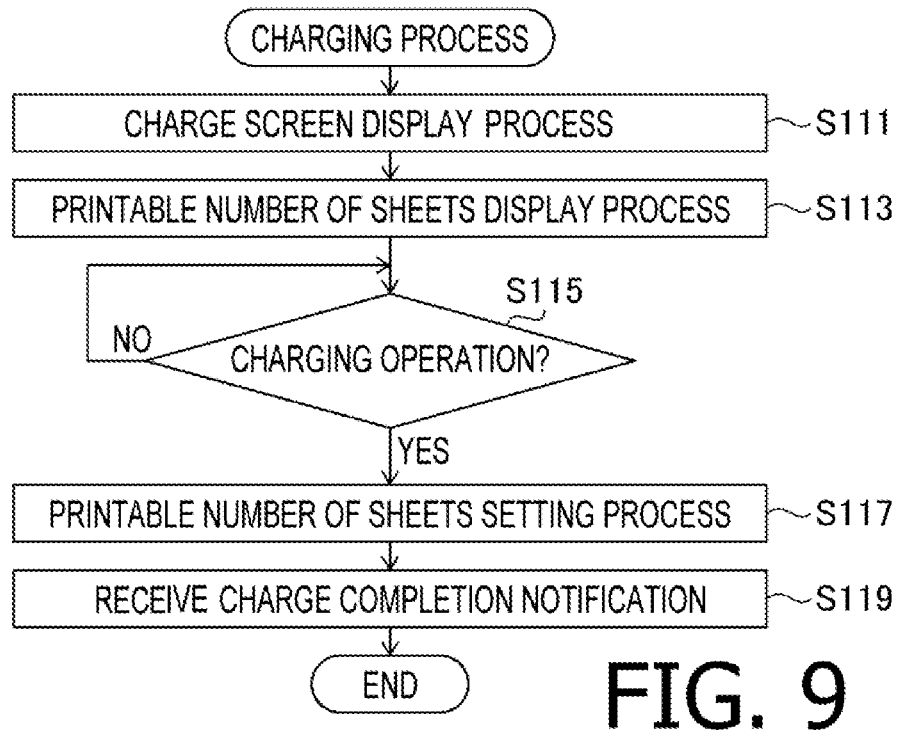
FIG. 9 is a flowchart illustrating a charging process performed by the portable terminal device.

In S131, the portable terminal device 10 receives the charge operation on the charge screen 71 (S115 in FIG. 9). In S133, in response to the reception of the charge operation by the user, the portable terminal device 10 transmits the permitted amount setting information for causing the server 30 to charge the charge number indicated on the charge icon 74 subject to the charge operation to the server 30 (S133, S117 in FIG. 9). The portable terminal device 10 transmits the device ID of the currently selected printer 20 (e.g., the printer 20 selected on the printer information displaying area 61), the selected charge number, and the instruction of addition, as the permitted amount setting information, to the server 30. It is noted that, the method of executing the charging process is not necessarily limited to the method of transmitting the instruction to add to the server 30 as described above. For example, a server that executes the settlement of the charge may be provided separately from the server 30, and the charging process to the server 30 may be initiated in response to the execution of the settlement process between the portable terminal device 10 and the server for settlement. Further, various methods of charging can be used, such as payment at convenience stores, over the counter payment, and bank debit.

In S133, the portable terminal device 10 transmitted to the server 30 the permitted amount setting information, including "an instruction to instruct addition," but the method of ordering addition is not necessarily limited to this. For example, the instruction command for addition and the permitted amount setting information, such as the charge number, may be transmitted to the server 30 as separate information. Alternatively, the server 30 may interpret the receipt of only the permitted amount setting information, such as the charge number and the device ID, as an instruction command for the charge and execute the charging process. In such a case, the portable terminal device 10 can instruct the charging by transmitting only the permitted amount setting information to the server 30. Further, the portable terminal device 10 may transmit not the instruction to add but a setting instruction to overwrite the current printable number of sheets with the increased printable number of sheets to the server 30, as the instruction of S133.

In S135, when receiving the permitted amount setting information from the portable terminal device 10, the server 30 updates a scheduled charge number associated with the device ID of the received permitted amount setting information in the server management table ST to the charge number. For example, when the server 30 receives permitted amount setting information with a device ID of "dv1" and a charge number of "2000", the server 30 updates the scheduled charge number "cg1" associated with "dv1" in the server management table ST to "2000" (see FIG. 3).

In S137, the server 30 executes a process to obtain the printable number of sheets stored in the printer management table PT from the printer 20. This is because the printable number of sheets of the printer 20 may have been updated (decreased) with the latest information when printing or other operations are executed. Alternatively, if another user has executed the charging process at the same time, the printable number of sheets in the printer management table PT may have been updated (increased).

The server 30 updates the printable number of sheets in the server management table ST of the printer 20 subject to charge with the printable number of sheets obtained in S137 (S139). That is, before increasing the printable number of sheets, the server 30 obtains the printable number of sheets of the printer 20 that is scheduled to be charged and updates the printable number of sheets in the server management table ST to the latest status.

After updating the printable number of sheets in the server management table ST, the server 30 transmits the charge number to the printer 20 and requests the printer 20 to add the charge number (S141). When receiving the charge number from the server 30, the printer 20 determines whether it is ready to perform charging (S143). For example, when printing is in progress, the printable number of sheets may fluctuate during the charging process. Therefore, when the printer 20 is performing printing, the printer 20 determines that charging cannot be performed and waits until the printing process is completed. Alternatively, the printer 20 notifies the server 30 that the charging cannot be performed. It is noted that, the printer 20 may be configured to perform charging even during printing.

When the printer 20 determines in S143 that charging is executable, the printer 20 notifies the server 30 that it is ready to charge (S145). In S145, the printer 20 transmits, to the server 30, the value of the printable number of sheets after adding the charge number received in S141 to the printable number of sheets in the printer management table PT. In this way, the server 30 can confirm that the charge number has been successfully transmitted to the printer 20 by checking the printable number of sheets after the addition. When receiving the charge preparation completion notification in S145, the server 30 transmits a response notification to the printer 20 to indicate that the server 30 has received the notification (S147). When receiving the response notification in S147, the printer 20 adds the charge number to the printable number of sheets in the printer management table PT, thereby updating the printable number of sheets (S149).

When receiving the charge preparation completion notification in S145, the server 30 updates the scheduled charge number associated with the device ID of the printer 20 to be charged in the server management table ST to zero (S151). When updating the scheduled charge number, the server 30 updates the printable number of sheets of the printer 20 to be charged to the printable number of sheets after the charging process (S153).

In this way, the server 30 can update the printable number of sheets in the server management table ST of its own device after reliably updating the printable number of sheets of the printer 20. For example, when the server 30 transmits the charge order of S141 to the printer 20 and then increases the printable number of sheets in the server management table ST before the printer 20 responds, the printable number of sheets of the printer 20 may not be increased and the scheduled charge number may be zero. As a result, by the non-printing time synchronization process in FIG. 8, the printable number of sheets in the server management table ST of the server 30 may be updated by the printable number of sheets in the printer management table PT of the printer 20 that has not been charged.

Even if the communication between the server 30 and the printer 20 is disconnected during the charging process, the server 30 can resume the charging process again for the printer 20 that still has the scheduled charge number. On the other hand, if the printer 20 executes the process of increasing the printable number of sheets in the printer management table PT before receiving the response notification of S147, for example, immediately after receiving the notification in S141, for example, if the communication between the printer 20 and the server 30 is disconnected at the stage where the notification of S141 is executed, the scheduled charge number may not become zero and only the printable number of sheets in the printer management table PT may increase, which is a fraudulent act. Therefore, the server 30 and the printer 20 make the notifications in S145 and S147 to confirm that both the server 30 and the printer 20 are in a position to execute the charging process without fail, and then increase each other's printable number of sheets. In this way, the occurrence of unauthorized charging of the printable number of sheets can be suppressed.

In S139 and S153, the server 30 updates the printable number of sheets in the server management table ST with the printable number of sheets obtained from the printer 20, that is, overwrites the data. On the other hand, in S149, the printer 20 adds the charge number obtained from the server 30 to the printable number of sheets in the printer management table PT. This is because, in the present embodiment, the printer 20 may update the printable number of sheets from time to time by performing printing, i.e., the printer 20 maintains the latest printable number of sheets information, and except for the initial charge, it is basically desirable to match the printable number of sheets of the printer 20 with the printable number of sheets of the server 30.

After updating the printable number of sheets in the printer management table PT in S149, the printer 20 transmits a completion notification to the server 30 indicating that the charge is complete (S155). The printer 20 may transmit only information indicating the completion of the process, for example, or information on the printable number of sheets after the charge number has been added. The server 30 updates the printable number of sheets in the server management table ST in S153, and upon receipt of the completion notification in S155, transmits a notification to the portable terminal device 10 indicating that the charge is completed (S157). When receiving the charge completion notification (S119 in FIG. 9), the portable terminal device 10 terminates the charging process shown in FIG. 9.

It is noted that the above charging process is an example. The portable terminal device 10 may notify the server 30 of the printable number of sheets after adding the charge number without notifying the server 30 of the charge number in S117 and S133. The server 30 may update the printable number of sheets in the server management table ST and printer management table PT with the increased number of sheets received from the portable terminal device 10. Further, the portable terminal device 10 does not have to transmit the number of sheets, such as the charge number, to the server 30. For example, each of the 74 charge icons shown in FIG. 10 may be assigned an identification number, and the portable terminal device 10 may notify the server 30 of the identification number of the selected charge icon 74. The server 30 may have a database that associates the identification numbers of the 74 charge icons with the charge numbers, and may identify the charge number based on the identification number received from the portable terminal device 10. Further, the portable terminal device 10 may receive the charge number as a numerical value such as 2500.

The printing system 1 may perform auto-charging, which automatically charges the printable number of sheets. For example, the portable terminal device 10 may set a charge number in advance to the server 30 for the selected printer 20 to be charged when the printable number of sheets of the printer 20 decreases to a particular printable number of sheets. The server 30 may then execute the synchronization process and, based on the printable number of sheets of the printer 20 decreasing to the particular printable number of sheets, cause the printer 20 to execute a process to add the preset charge number of sheets to the printable number of sheets, and then synchronize. In such a case, the process of setting the charge number for auto-charge from the portable terminal device 10 to the server 30 is an example of the permitted amount setting process in this application. Therefore, the permitted amount setting process and the addition process of the permitted recording amount in this application do not have to be performed at the same time. After the permitted recording amount is set to the server 30, and after certain conditions, such as auto-charging, are met, the addition process of the permitted recording amount may be performed.

Requesting Process

Next, the requesting process performed by the portable terminal device 10 will be described referring to the flowchart shown in FIG. 12. The requesting process is a process in which the user is prompted to replace the printer 20 based on a notification from the server 30, and applies to the server 30 for the replacement of the printer 20. For example, when the portable terminal device 10 starts application 12B, which executes printing by the printer 20, and the like, the portable terminal device 10 starts the process shown in FIG. 12. It is noted that, the server that applies for the replacement can be a server other than the server 30 that manages the printable number of sheets and the like.

Figure 12:
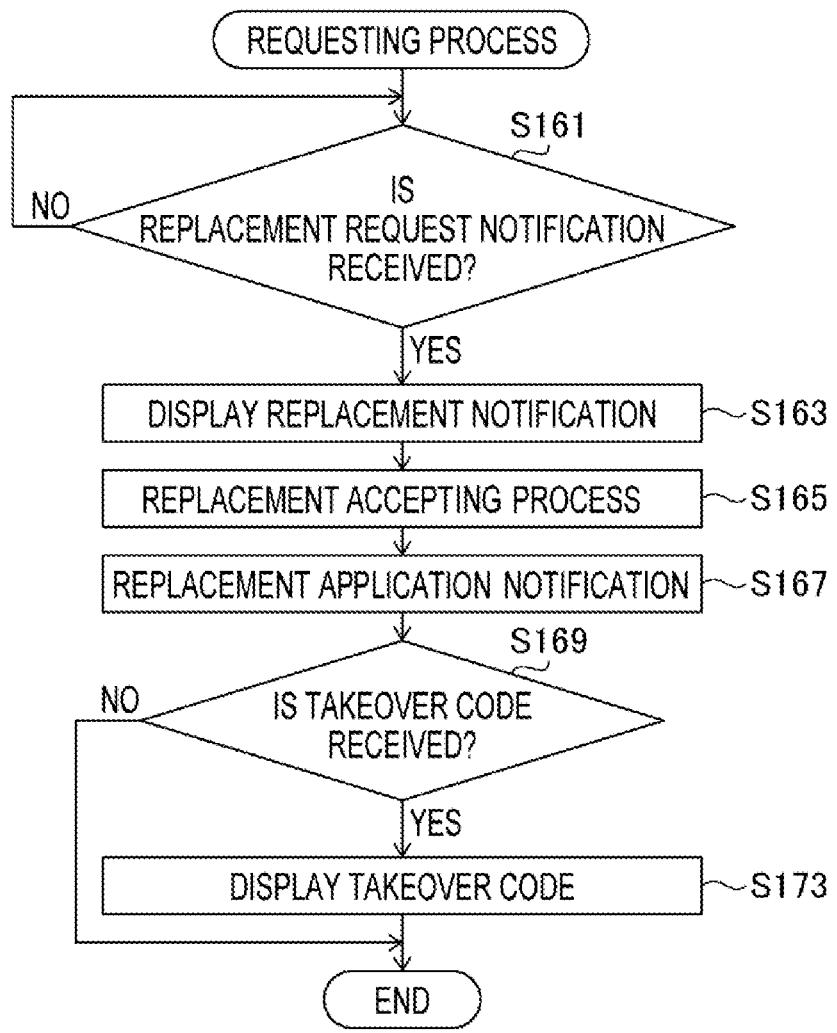
FIG. 12 is a flowchart illustrating a requesting process performed by the portable terminal device.
Figure 13:
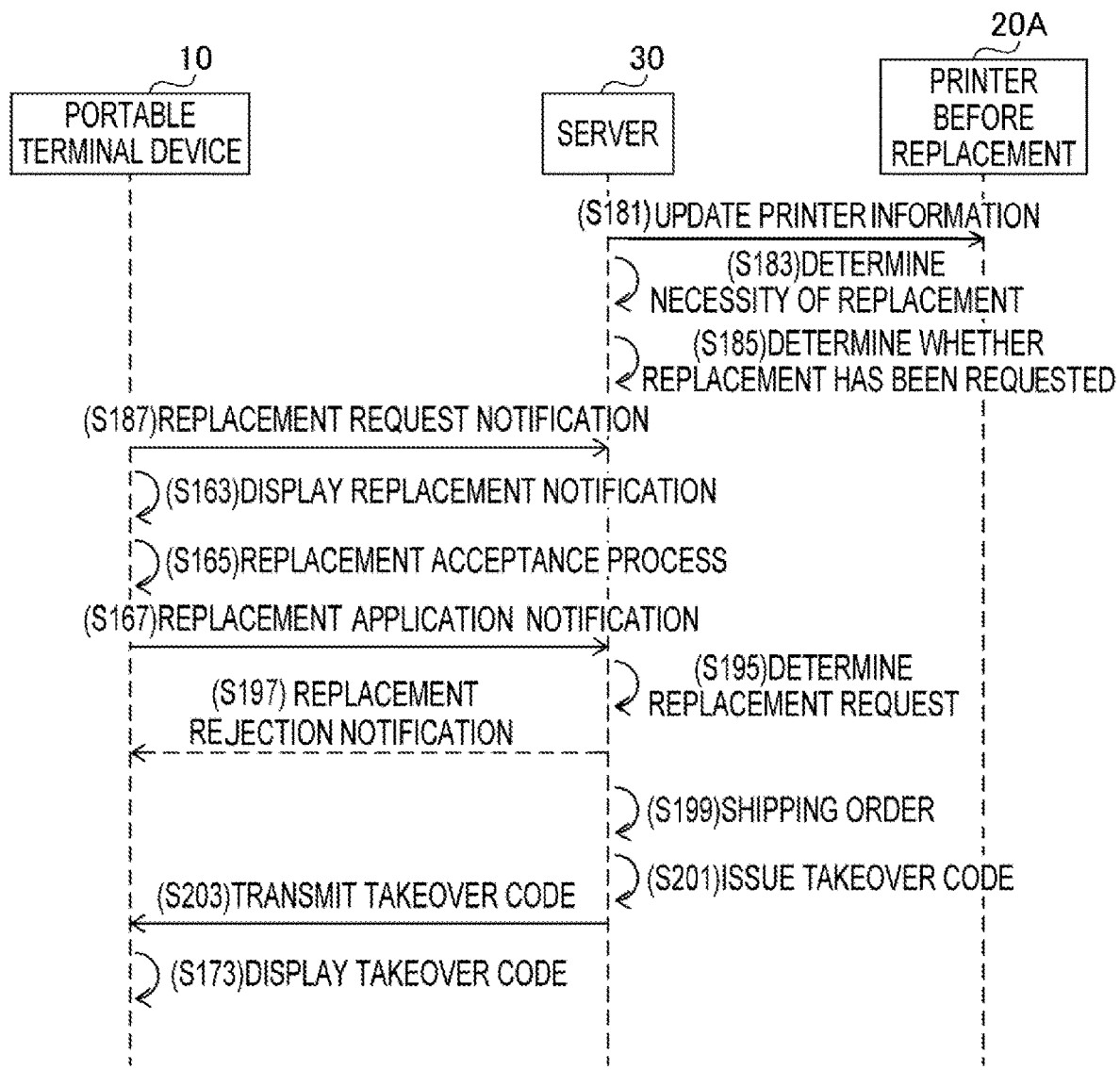
FIG. 13 is a sequence chart showing a case where the requesting process is performed.

In S161 of FIG. 12, the portable terminal device 10 determines whether a replacement request notification is received from the server 30. The replacement request notification is a notification from the server 30 to the portable terminal device 10 to request for application of the replacement of the printer 20. The portable terminal device 10 performs a decision process in S161 until the replacement request notification is received (S161: NO), and when the replacement request notification is received (S161: YES), the replacement notification is displayed on the display 14 (S163). After displaying the replacement notification, the portable terminal device 10 executes the replacement accepting process (S165).

When the portable terminal device 10 executes the replacement accepting process (S167) based on the user's operation input to the input I/F 15, the portable terminal device 10 transmits a replacement application notification to the server 30 (S167) and determines whether a takeover code is received from the server 30 (S169). When the portable terminal device 10 fails to receive the takeover code (S169: NO), the portable terminal device 10 terminates the process shown in FIG. 12. On the other hand, when receiving the takeover code (S169: YES), the portable terminal device 10 displays the received takeover code (S173) on the display 14, and then terminates the process shown in FIG. 12.

Operation of Printing System in Requesting Process

Next, user's operations and processes performed by respective devices in the requesting process will be described. For convenience of explanation, the printer 20 before the replacement is referred to as a printer 20A and the printer 20 after the replacement is referred to as a printer 20B (see FIG. 16) in the following description. Further, when referring to printers 20A and 20B collectively, they will be referred to as printers 20.

In S181, the server 30 updates the printer information. The printer 20 updates the information on the remaining ink amount in the printer management table PT with the latest information on the remaining ink amount by using the remaining ink detector 24 in the non-printing time synchronization process shown in FIG. 8, for example, and periodically transmits the remaining ink amount together with the printable number of sheets to the server 30. The server 30 updates the remaining ink amount associated with the device ID of the transmitting-source printer 20 based on the information received from the printer 20. In this way, the information on the remaining ink amount in the printer management table PT and the server management table ST are synchronized.

It is noted that, the timing at which the printer 20 transmits the remaining ink amount to the server 30 is not necessarily limited to the timing of the non-printing time synchronization process, but may also be at a particular timing, such as when the printer 20 is powered on. Further, the entity that obtains the remaining ink amount may be the server 30. For example, among the printers registered in the server management table ST, the server 30 may maintain a constant connection to a particular communication port for the printer 20 for which the activation information is on, and may inquire information on the remaining ink amount at every particular time. The server 30 may update the remaining ink amount in the server management table ST based on the inquiry results.

When receiving information on the remaining ink amount from each printer 20 (S181), the server 30 determines whether the replacement is necessary for each printer 20 (S183). The server 30 determines that the printer 20 needs to be replaced (S183: YES) when the remaining ink amount of the printer 20 falls less than or equal to a particular amount. It is noted that, the method of determining whether the replacement is necessary is not necessarily limited to the method of comparing the remaining ink amount with the particular amount. For example, the server 30 may calculate the amount of remaining ink amount from the updated information on the remaining ink amount and estimate the date and time when the ink is expected to run out completely. Server 30 may determine that the replacement is necessary a particular number of days before the estimated date and time. Alternatively, the server 30 may estimate the number of sheets that can be printed with the remaining ink amount from the updated information on the remaining ink amount and the printable number of sheets, and determine that the replacement is necessary when the number of sheets that can be printed is less than or equal to a particular number of sheets. Optionally, the server 30 may receive from the user the particular values of the above-mentioned criteria for determining the remaining ink amount, the particular number of days before the ink runs out, the particular number of sheets that can be printed, and so on.

The server 30 may use information other than the remaining ink amount to determine whether the replacement is necessary. For example, the server 30 may determine the necessity of the replacement based on the number of days elapsed from a reference date and time, such as the date and time of manufacture of the printer 20, the date and time of purchase, or the date and time of the first registration in the server management table ST. In this way, the server 30 can determine whether the replacement is necessary based on the length of time the user has used the printer 20. Alternatively, the server 30 may notify the replacement based on the date of sale of a successor model of the printer 20, a newer model of the printer 20, or the like. The determination of when a successor model will be available may be based on a fixed number of years, such as two or four years, or on release information from the vendor. The server 30 may, for example, notify the replacement based on the fact that the total number of sheets printed since the printer 20 has been in use has reached a particular number of sheets. The determination of whether the replacement is necessary may be performed by a device other than the server 30, such as the portable terminal device 10 or the printer 20. The portable terminal device 10 may perform the display of the replacement notification based on the remaining ink amount obtained from the printer 20.

The server 30 determines whether the replacement request information in the server management table ST is ON, i.e., whether the application of the replacement has already been completed, for the printer 20 that has been determined to require replacement in S183 (S185). When the server 30 determines that no replacement has been requested for the target printer 20 (S185: YES), the server 30 notifies the portable terminal device 10 of a replacement request notification (S187). In S187, the server 30 may, for example, send a replacement request notification for the printer 20A to be replaced to the portable terminal device 10 of a user who has registered as a user and who can perform the charging process shown in FIG. 9 to FIG. 11, or more concretely, a user who has registered a payment method such as credit card registration. The replacement request notification may be transmitted only to the application 12B in which the registered user is logged in. Alternatively, the server 30 may transmit a replacement request notification to the portable terminal devices 10 of all the users who have registered as users or to the application 12B in which the user is logged in. The server 30 may transmit the replacement request notification to all the users who have used the printer 20A, e.g., all the portable terminal devices 10 that transmitted a print instruction to the printer 20A in the past. The server 30 may transmit the replacement request notification to an e-mail address or the like in addition to the portable terminal device 10.

Figure 14:
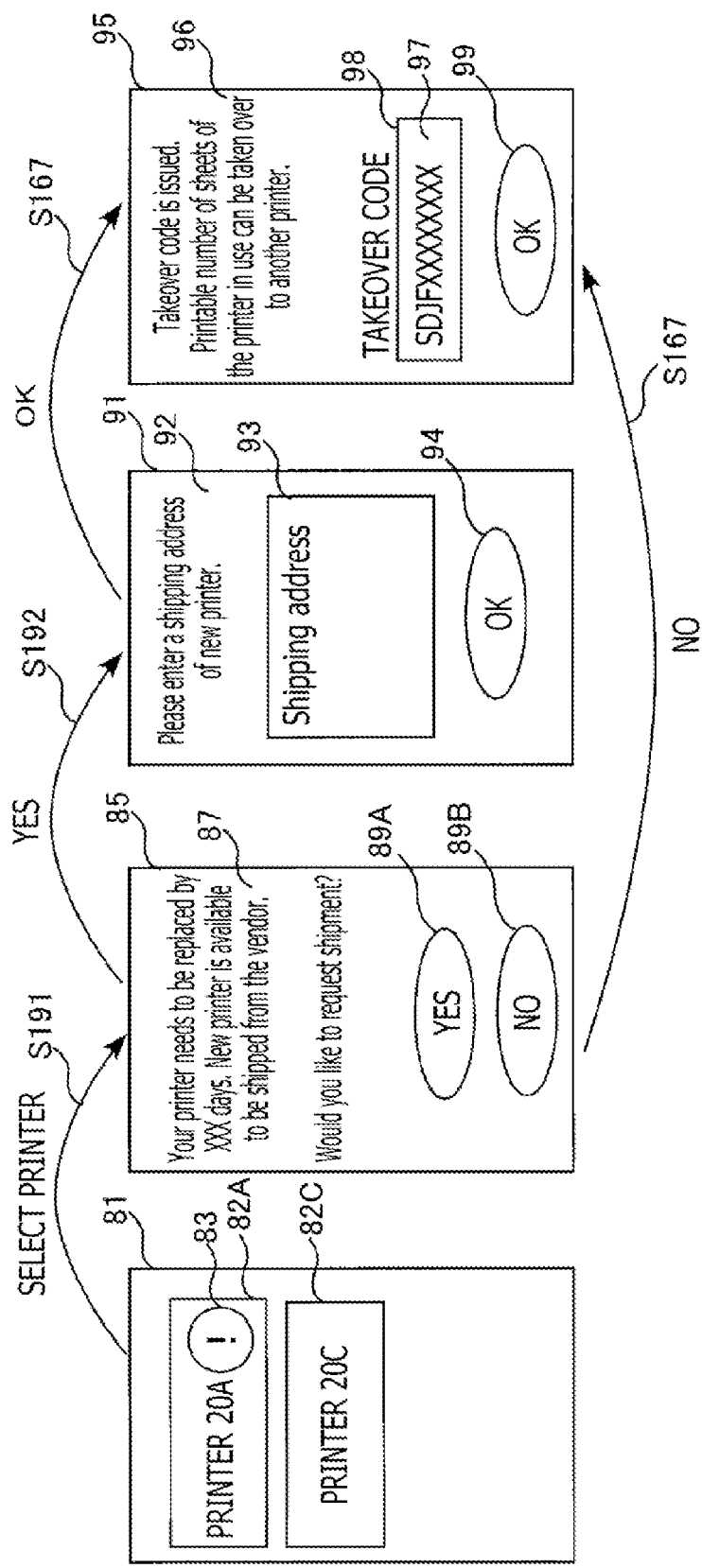
FIG. 14 illustrates transition of the display screen which is displayed on the display of the portable terminal device in the requesting process.

When receiving the replacement request notification of S187 (S161: YES in FIG. 12), the portable terminal device 10 displays the replacement notification on the display 14 (S163). FIG. 14 shows transition of the display screen that is displayed on the display 14 in the requesting process. When starting the application 12B, for example, the portable terminal device 10 searches for printers 20 on the same network and displays a screen 81 displaying icons 82 indicating the detected printer names in a list on the display 14. The printers 20 that appear in this list are, for example, printers for which communication settings have been completed and initial installation has been completed. The server 30 notifies, in the replacement request notification, the device ID of the printer 200A which is identified by the device ID, from the list displayed on the screen 81. In this way, it is possible to prompt the user to operate the icon 82 of the printer 20A.

After displaying the replacement notification in S163, the portable terminal device 10 executes the replacement acceptance process (S165). For example, in the state of displaying a screen 81 in FIG. 14, when the portable terminal device 10 receives an operation to select the icon 82 of the printer 20A via the input I/F 15 (S191), the portable terminal device 10 displays a screen 85 on the display 14. The portable terminal device 10 displays a message 87 on the screen 85 indicating an estimated number of days until replacement is needed. The server 30 can determine the number of days to display, for example, by estimating the amount of ink to be reduced from the history of past ink level updates and predicting the date and time when the ink will run out. Then, the server 30 notifies the portable terminal device 10 of this number of days in the replacement request notification of S187, thereby causing the number of days to be displayed on the screen 85. Further, the portable terminal device 10 displays a message 87 confirming whether or not the user wants the new printer 20 to be shipped from the vendor, and icons 89 respectively indicating words "YES" and "NO" on the screen 85.

When the icon 89 bearing the word "YES" is selected (S192), the portable terminal device 10 displays a screen 91, on the display 14, with a message 92 asking the user to enter a shipping address for the new printer, an input field 93 for entering a shipping address, and an icon 94 with the word "OK" displayed thereon. When the portable terminal device 10 receives the shipping address of the new printer 20 which is input in the input field 93 and the "OK" icon 94 is selected, the portable terminal device 10 transmits the replacement application notification including information on the shipping address to the server 30 (S167). Further, when the "NO" icon 89 is selected on the screen 85, the portable terminal device 10 also transmits the replacement application notification to the server 30 (S167). The replacement application notification is a response to the replacement request notification of S187, and contains information indicating that the replacement has been requested by the user, for example, information indicating a recipient (transmitter) who has received the S187 replacement request notification. The information indicating the recipient here is, for example, the user ID or the ID of the application 12B.

When receiving the replacement application notification (S167), the server 30 makes a determination of the received replacement application (S195). If, for example, the user ID of the transmission destination of transmission in S187 does not match the user ID of the replacement application notification received in S167, the server 30 rejects the replacement application (S195: NO) and transmits a replacement rejection notification to the portable terminal device 10 (S197). The portable terminal device 10 makes a negative decision (S169: NO) in FIG. 12 and terminates the process. For example, if a replacement application notification is improperly transmitted under false pretenses, even though the server 30 has not transmitted a replacement request notification, the server 30 may arrange for the shipment of a new printer 20A although the due for replacement is not close. Therefore, the server 30 in the present embodiment approves the replacement application only when the destination of the replacement application notification and the source of the replacement request notification match. It is noted that, the server 30 does not have to perform the determination of the replacement request in S195.

Figures 18A, 18B:
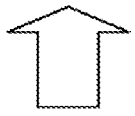
FIGS. 18A and 18B show data in the server management table corresponding to the printers before and after replacement before and after the execution of the takeover process shown in FIG. 15.

When the user ID of the destination in S187 and the user ID of the source in S167 match, the server 30 approves the application request (S195: YES). FIGS. 18A and 18B show the state of the server management table ST when the printable number of sheets is taken over from the printer 20A before replacement to the printer 20B after replacement. When the server 30 makes a positive decision at S195 and approves the replacement application, the server 30 changes the replacement application information corresponding to the printer 20A (the replacement application information corresponding to the device ID "dv1" in FIG. 18A) to the ON state. In this way, even when the server 30 determines again in the determining process of S183 that replacement is necessary (S183: YES), the server 30 does not transmit the replacement application notification of S187 as a negative determination is made in S185. This configuration prevents the replacement request notification from being transmitted unnecessarily each time the remaining ink amount decreases. It is noted that, the server 30 does not have to use the replacement application information. The server 30 may notify a replacement request notification each time the remaining ink level is updated in S181 for the printer 20 that is determined to require replacement in S183. In such a case, the server management table ST does not need to have replacement application information.

When the replacement application notification received in S167 includes information on the shipping address, the server 30 orders the shipment of a new printer 20 (S199). For example, the server 30 notifies the distribution center of the shipping address information and the model information of the printer 20B after the replacement. Further, a user who does not wish a shipment can use a printer 20B other than the printer 20A at home. Alternatively, the user can obtain the printer 20B from a real store, such as a retail store or electronics retail store, or a virtual store, such as an e-commerce site established on the Internet 3, and prepare the printer 20B that takes over the printable number of sheets of the old printer 20A.

When approving the replacement application in S195, the server 30 issues a takeover code (S201) and transmits the issued takeover code to the portable terminal device 10 (S203). When receiving the takeover code in S203, the portable terminal device 10 makes a positive determination (S169: YES) in FIG. 12 and displays the takeover code (S173). After transmitting the S167 replacement application notification and receiving the takeover code, the portable terminal device 10 displays the screen 95 shown in FIG. 14 on the display 14. The portable terminal device 10 displays a message 96 indicating that the takeover code is to be displayed, a takeover code field 98 displaying the takeover code 97, and an icon 99 with the word "OK" on the screen 95. When receiving the selection of the icon 99 with the screen 95 being displayed, the portable terminal device 10 displays the menu screen 51 (FIG. 5) of the printer 20A, for example, on the display 14.

This takeover code 97 is used to determine whether the user performing the takeover process to take over the printable number of sheets from the printer 20A before the replacement to the printer 20B after the replacement is the user who performed the requesting process. As shown in FIGS. 18A and 18B, the takeover code 97 is a string of alphanumeric characters, for example, and is temporarily associated with the device ID of the printer 20A that has received the replacement application in the server management table ST. The user may record the takeover code 97 displayed on the screen 95 by writing the code down or by other means.

Takeover Process

Figure 15:
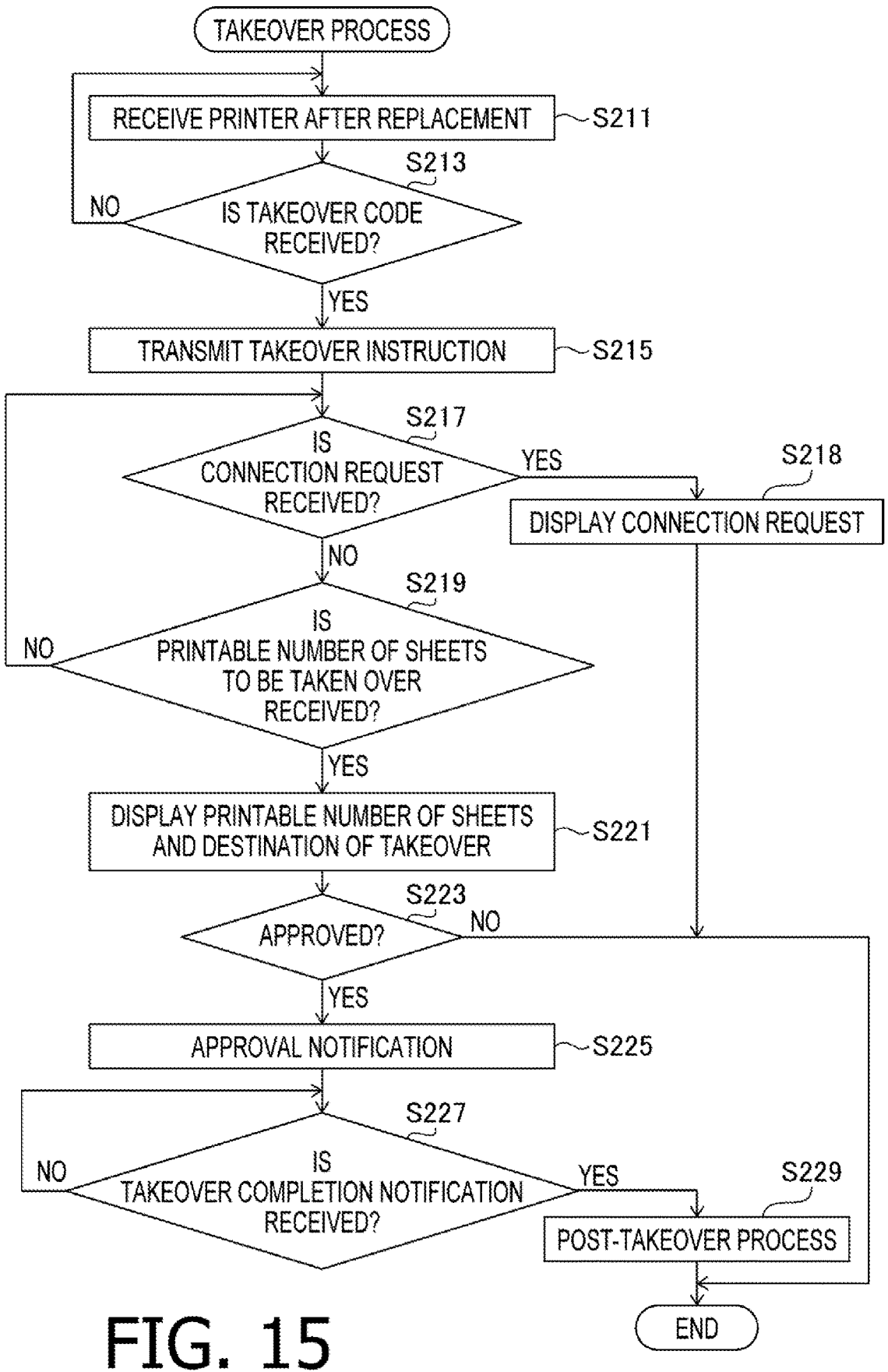
FIG. 15 is a flowchart illustrating a takeover process performed by the portable terminal device.

Next, the takeover process performed by the portable terminal device 10 is described using the flowchart shown in FIG. 15. The takeover process is the process of taking over the printable number of sheets from the printer 20A before replacement to the printer 20B after replacement. For example, when receiving a particular operation shown in FIG. 17 below, the portable terminal device 10 starts the process shown in FIG. 15.

In S211 of FIG. 15, after receiving the designation of the printer 20B after replacement, the portable terminal device 10 determines whether it has received the input of the takeover code 97 (S213). When the portable terminal device 10 does not receive the takeover code 97 (S213: NO), the portable terminal device 10 receives the designation of the printer 20B, or the like (S211).

On the other hand, when receiving the input of takeover code 97 (S213: YES), the portable terminal device 10 transmits a takeover instruction to the server 30 (S215). Next, the portable terminal device 10 determines whether the portable terminal device 10 has received a connection request from the server 30 requesting connection of the printer 20A before replacement (S217). When receiving the connection request (S217: YES), the portable terminal device 10 displays a screen on the display 14 requesting the connection of the printer 20A (S218), and then terminates the process shown in FIG. 15.

When the portable terminal device 10 has not received the connection request (S217: NO), the portable terminal device 10 determines whether the printable number of sheets to be taken over from the printer 20A to the printer 20B is received from the server 30 (S219). The portable terminal device 10 repeats the decision process of S217 until the printable number of sheets is received (S219: NO). When receiving the printable number of sheets (S219: YES), the portable terminal device 10 displays the received printable number of sheets, i.e., the printable number of sheets to be taken over, the destination of the takeover, and other information on the display 14 (S221), and receives the user's approval on the displayed contents of the takeover (S223).

It is noted that, the method of notifying the printable number of sheets to be taken over is not necessarily limited to the method of displaying the printable number of sheets on the display 14. For example, the server 30 may display the printable number of sheets to be taken over on the user I/F 27 of printer 20A, or transmit the printable number of sheets to be taken over to the user's e-mail address or other address.

If the contents of the takeover are not approved by the user (S223: NO), the portable terminal device 10 terminates the process shown in FIG. 15. On the other hand, if the contents of the takeover are approved (S223: YES), the portable terminal device 10 transmits an approval notification to the server 30 (S225) indicating that the takeover contents have been approved by the user. After transmitting the approval notification, the portable terminal device 10 determines whether or not the portable terminal device 10 has received a takeover completion notification from the server 30 indicating that the takeover process has been completed (S227). The portable terminal device 10 repeats the decision process of S227 until (S227: NO) the takeover completion notification is received. When receiving the takeover completion notification (S227: YES), the portable terminal device 10 executes the post-takeover process (S229) and then terminates the process shown in FIG. 15.

Operation of Printing System in Takeover Process

Figure 17:
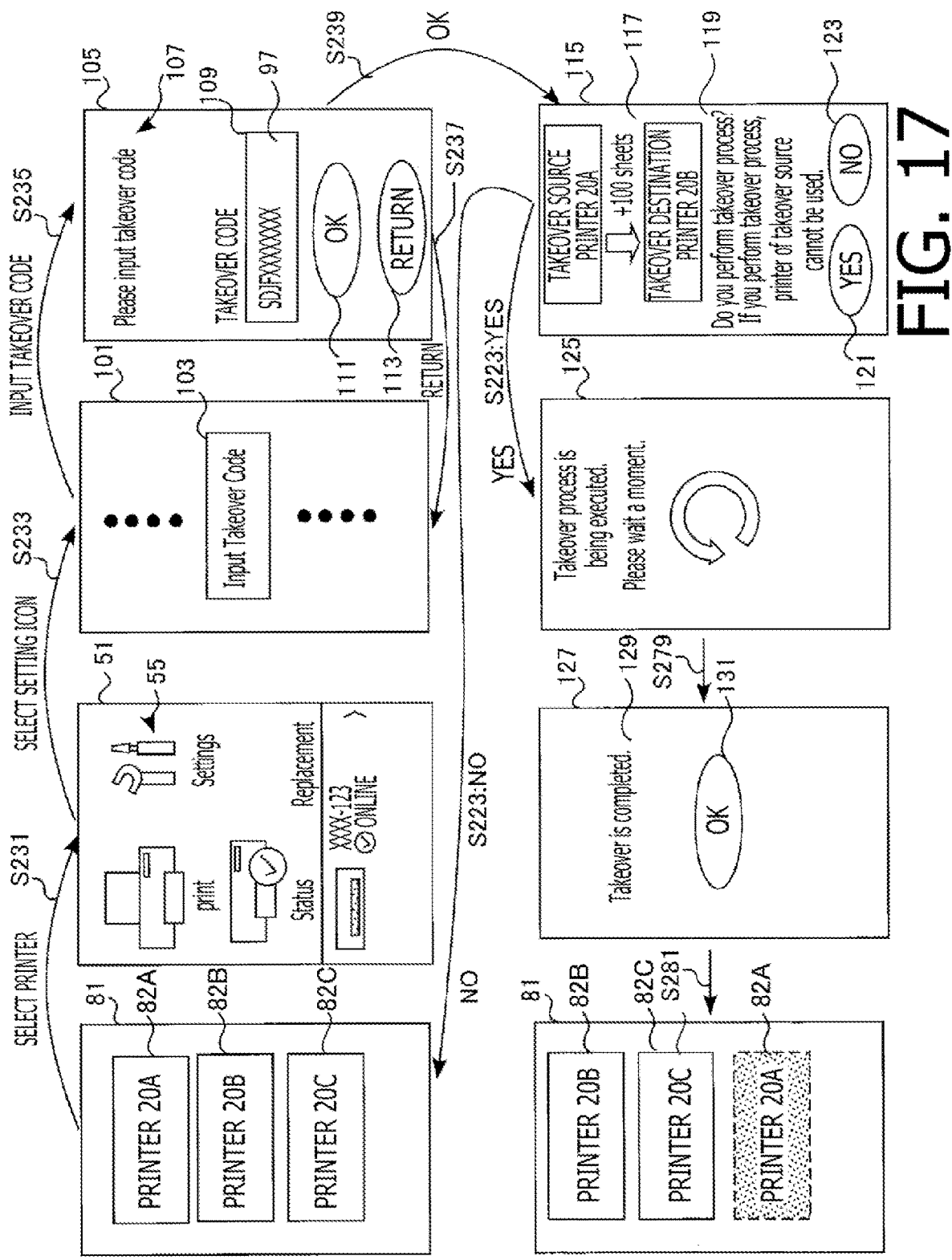
FIG. 17 illustrates transition of the display screen which is displayed on the display of the portable terminal device in the takeover process.

Next, operations by the user and processes of respective devices in the takeover process will be described. In S211, the portable terminal device 10 performs the process of receiving the printer 20B after replacement. FIG. 17 shows the transition of the display screen shown on display 14 in the takeover process. When the portable terminal device 10 starts the application 12B, for example, as in FIG. 14, the portable terminal device searches for the printers 20 on the same network and displays a screen 81 on the display 14 showing a list of icons 82 with the names of the printers as detected being indicated thereon. After obtaining the takeover code 97 in the requesting process described above, the user performs an operation to select the icon 103 of the printer 20B (after replacement) that the user wants to take over on the screen 101 using the input I/F 15. It is noted that, when the above requesting process is completed, the portable terminal device 10 may turn off the warning display 83 of the printer 20A when the screen 81 is displayed again, as shown in FIG. 17.

In the following description, as an example, a case in which the printable number of sheets is taken over to a new printer 20B shipped from the vendor is described. For example, as shown in the screen 81 in FIG. 14, the printer 20B is not owned by the user at the stage of performing the requesting process and does not exist on the network to which the printer 20A is connected. After requesting the shipment of printer 20B, the user, for example, performs communication settings for the printer 20B delivered to the user's house, and connects the printer 20B to the router 2 to put the printer 20B and the server 30 in a state where communication between the printer 20B and the server 30 is possible. In this state, as shown in screen 81 in FIG. 17, the printer 20B has completed its initial introduction and communication settings and appears in the list, but the activation information is turned off and the printer 20 is unable to print. It is noted that, the user may take over the printable number of sheets from the printer 20A to the printer 20B of which the activation information is ON (printable), e.g., the printer 20B is already in use. In such a case, the user can also take over the printable number of sheets by selecting the printer 20B on the screen 81 in FIG. 17.

When the icon 82 of the printer 20B after replacement is selected, the portable terminal device 10 displays the menu screen 51 of the printer 20B on the display 14 (S231). The portable terminal device 10, for example, displays a screen 101 when receiving an operation to select the setting icon 55 on the menu screen 51 with the input I/F 15 (S233). The portable terminal device 10 displays, on the screen 101, a plurality of icons 103 that receive settings for the printer 20B, and displays an icon indicating "input of the takeover code" as one of the plurality of icons 103.

When the "input of takeover code" icon 103 is selected, the portable terminal device 10 displays the screen 105 (S235). The portable terminal device 10 displays a message 107 prompting the user to input the takeover code, an input field 109 for inputting the takeover code 97, an icon 111 displaying a word "OK," and an icon 113 displaying a word "Return" on the screen 105. When the "Return" icon 113 is selected, the portable terminal device 10 makes a negative decision (S213: NO) in S213 of FIG. 15 and displays a screen 101 on the display 14 (S237). In response to the operation input of the input I/F 15, the portable terminal device 10 receives the selection of "input of takeover code" again and displays the screen 105, or displays the screen 81, and again performs the process of receiving the selection of the printer 20 after replacement (S211 in FIG. 15).

On the other hand, when the "OK" icon 111 is selected with the takeover code 97 being entered in the input field 109, the portable terminal device 10 transmits the takeover instruction to the server 30 (S239, S215 in FIG. 15). The portable terminal device 10 transmits the device ID of the printer 20B selected on the screen 81 and the information on the takeover code 97 input in the input field 109 on the screen 105 to the server 30, including the same in the takeover instruction.

When receiving the takeover instruction in S215, the server 30 executes a process to search the network for the printer 20A before replacement (S241) based on the received takeover code 97. The server 30 transmits, for example, a message confirming the connection status of the communication to the printer 20A (S243), and checks the connection status of the communication based on the response to the message by the printer 20A to the message. When the server 30 cannot receive a normal response from the printer 20A, the server 30 transmits a connection request to the portable terminal device 10 (S245). In such a case, the portable terminal device 10 makes a positive decision (S217: YES) in FIG. 15 and displays the connection request on the display 14 (S218). The portable terminal device 10 displays a message on the display 14, for example, "Printer 20A before replacement does not seem to be connected to the network, please check the connection." In this way, the user can be prompted to work on connecting the printer 20A to the network.

On the other hand, when the server 30 receives a normal response from the printer 20A in response to the message confirming the connection status of communication in S243 (S247), the server 30 transmits a print restriction instruction to the printer 20A to restrict printing (S249). When receiving the print restriction instruction from the server 30, the printer 20A shifts to the state of restricting printing (S251). The printer 20A shifts to a state where, for example, the printer 20A does not accept print instructions from the portable terminal device 10 or print instructions based on the operation input of the user I/F 27, or does not execute printing even when the printer 20A accepts such instructions. When the printer 20A completes the shift to the state of restricting printing, the printer 20A responds to the server 30 that the shift is completed (S253). It is noted that, when the printer 20A is in the process of printing or has a print job scheduled to be executed, it is preferable to shift to the state of restricting printing after the printing is completed.

The method by which the server 30 confirms communication with the printer 20A is not necessarily limited to transmitting the confirmation message as described above. In a configuration where periodic communication from the printer 20 to the server 30 is performed, the server 30 may, for example, determine that the server 30 is able to communicate with the printer 20A when the server 30 receives access from the printer 20A within a certain period of time. Alternatively, the server 30 may determine that communication is possible if, for example, the printer 20A is accessed within a certain period of time and the server 30 is able to transmit the print restriction instruction to the printer 20A.

The method of restricting printing in S249 and S251 is not limited to the method of shifting the printer 20A to the state where printing is restricted as described above. For example, the printable number of sheets in the printer management table PT of the printer 20A may be changed to zero. In such a case, the information on the printable number of sheets may be temporarily saved to another storage area in the printer memory 26B. Alternatively, printing may be restricted by changing the printable number of sheets to a smaller number, such as one sheet, instead of changing the same to zero. Further alternatively, the printer 20 may be configured so that printing cannot be performed when the remaining printable number of sheets falls below a particular number (e.g., one sheet). Then, the server 30 may restrict printing by setting the printable number of sheets in the printer management table PT of printer 20A to one or less. Alternatively, printing may be restricted by prohibiting the operation of particular devices, such as the print engine 25.

When receiving the transition completion notification from the printer 20A in S253, the server 30 transmits an instruction to the printer 20 requesting the printable number of sheets (S255). When receiving the request instruction in S255, the printer 20A transmits the printable number of sheets in the printer management table PT, i.e., the current printable number of sheets, to the server 30 (S257). When receiving the printable number of sheets from the printer 20A, the server 30 updates the printable number of sheets associated with the device ID of the printer 20A in the server management table ST to the received printable number of sheets (S259). In this way, the printable number of sheets in the server management table ST can be matched with the printable number of sheets in the latest state of the printer 20A. Further, by limiting the printing of the printer 20A, fluctuations in the printable number of sheets thereafter can be suppressed.

Figure 16:
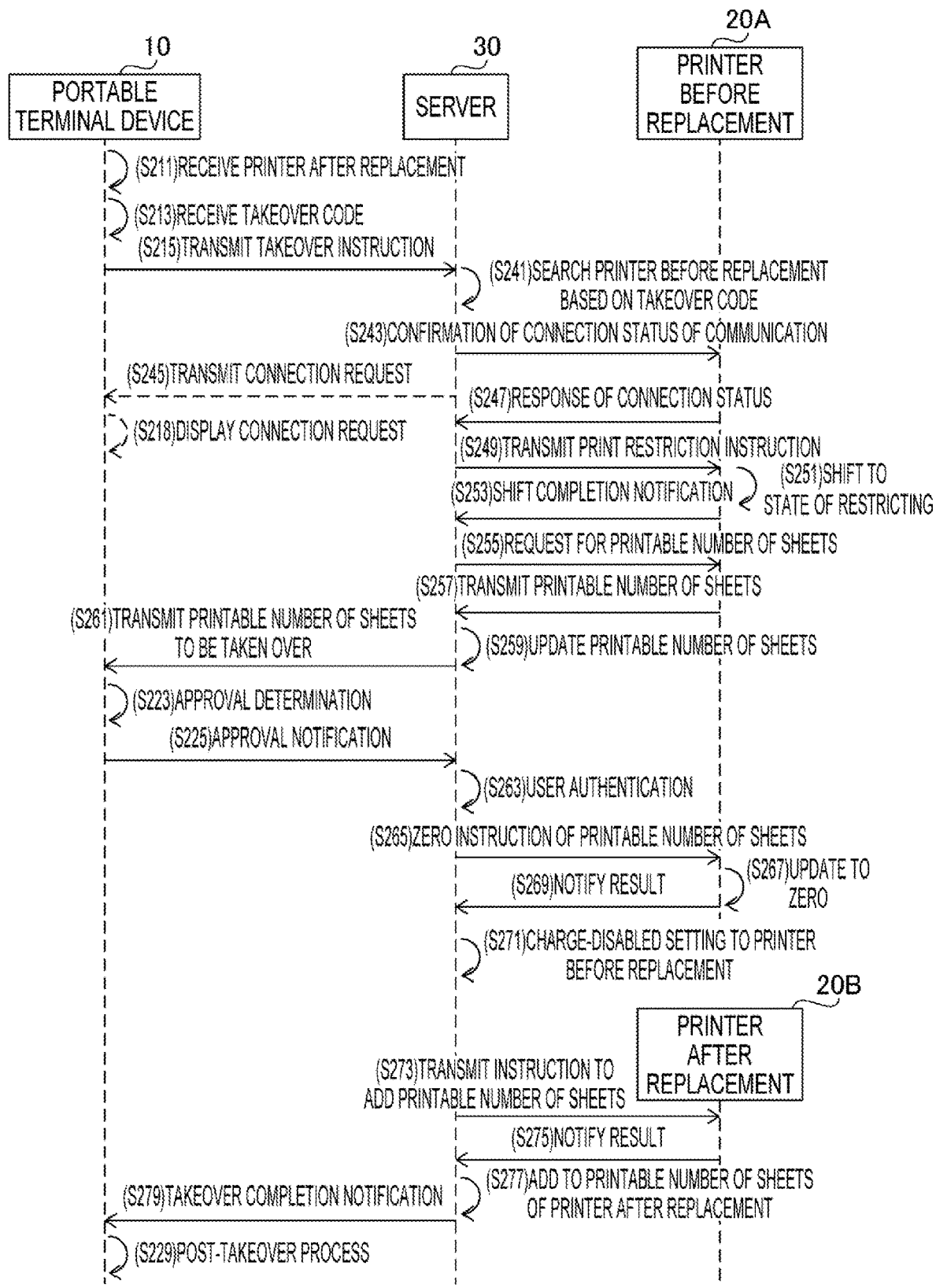
FIG. 16 is a sequence chart showing a case where the takeover process shown in FIG. 15 is performed.

When updating the printable number of sheets in the server management table ST, the server 30 transmits the updated printable number of sheets, that is, the printable number of sheets of the printer 20A, to the portable terminal device 10 as the information of the printable number of sheets to be taken over to the printer 20A (S261). As shown in FIG. 16 and FIG. 17, after the icon 111 on screen 105 is selected and the takeover instruction is transmitted to the server 30 (S239, S215 in FIG. 16), when the portable terminal device 10 receives the printable number of sheets (S261 in FIG. 16), a printable number of sheets displaying screen 115 is displayed on display 14 (S223 in FIG. 15). The portable terminal device 10 displays a takeover information field 117, a message 119, an icon 121 indicating a word "Yes", and an icon 123 indicating a word "No" on the screen 115.

The portable terminal device 10 displays information on the printer 20A from which information is taken over (i.e., before replacement), the printer 20B to which the information is taken over (i.e., after replacement), and the information of the printable number of sheets (e.g., 100 sheets) to be taken over in the takeover information field 117. Further, the portable terminal device 10 displays a message 119 stating that if the takeover is executed, the printer 20A from which the information is taken over cannot be used. Reviewing the contents of the takeover information field 117, the user checks whether the printable number of sheets is transferred between the intended printers 20A and 20B, and whether the printable number of sheets to be transferred is correct. When the content is not what the user intended, the user selects the "No" icon 123. If the icon 123 is selected, the portable terminal device 10 displays the screen 81 on the display 14, for example, and again receives the selection of the printer 20 after replacement (S223: NO). In such a case, the server 30 releases the printing restriction of the printer 20A because the takeover process is interrupted.

On the other hand, when the "Yes" icon 121 is selected (S223: YES), the portable terminal device 10 displays a screen on the display 14 indicating that the takeover process is being executed. Further, the portable terminal device 10 transmits the approval notification to the server 30 (S225). When receiving the approval notification, the server 30 performs user authentication (S263). In S263, the server 30 checks whether the user executing the takeover, i.e., the user who transmitted the approval notification in S225, is the user who uses the printer 20A before the replacement.

The method of user authentication is not limited. For example, in the user registration and the like shown in FIG. 4, the server 30 may register, in advance, the email address of the user using the printer 20A in the server management table ST in association with the device ID. Then, in S263, the server 30 transmits an email containing a URL for authentication to the registered user's email address, and if access to the URL can be detected within a particular period of time, the server 30 may determine that the user authentication is successful. Alternatively, the server 30 may transmit a so-called one-time password, which becomes invalid after a particular period of time, to the registered e-mail address as an attachment, and the application 12B of the portable terminal device 10 may receive the one-time pass to perform the user authentication. Further alternatively, instead of using an email address, for example, a token can be transmitted to the user in advance bundled with the printer 20A, and the application 12B may receive the input of a one-time pass that is displayed on the token. It is noted that, if the user authentication fails, the server 30 may transmit the fact that the authentication is failed to the portable terminal device 10 from which the authentication notification in S225 was transmitted. In such a case, the portable terminal device 10 may display a message such as "user authentication in the transfer process is failed" in S125. Further, the server 30 may release the printing restrictions on the printer 20A because the transfer process has been interrupted.

When the server 30 successfully authenticates the user in S263, the server 30 transmits a zero instruction to the printer 20A to set the printable number of sheets to zero (S265). When receiving the zero instruction, the printer 20A updates the printable number of sheets in the printer management table PT to zero (S267) and notifies the server 30 that the number of sheets is updated to zero (S269). In this way, the printable number of sheets of the printer 20A before transferring the printable number of sheets is set to zero, and then the printable number of sheets can be transferred to the new printer 20B. It is noted that, the server 30 may leave a particular number of sheets, such as one, without setting the printable number of sheets of the printer 20A to zero.

Upon receipt of the notification in S269, the server 30 executes the charge-disabled setting (S271), which restricts charging to the printer 20A before replacement. For example, the server 30 may store a "charge-disabled" flag in an item of the scheduled charge number of the printer 20A (see FIG. 18B), and when the server 30 receives a request from the portable terminal device 10 to charge the printer 20A, the server 30 may notify the portable terminal device 10 that the printer 20A cannot be charged based on the "charge-disabled" flag. Alternatively, if the server performing the charging is a different server, the server 30 may transmit a message to the server performing the charging that the printer 20A is prohibited from being charged.

After executing S271, the server 30 transmits an instruction to the printer 20B to add the printable number of sheets to be taken over, that is, the printable number of sheets of the printer 20A to the printable number of sheets of the printer 20B (S273). The printer 20B adds the received printable number of sheets to the printable number of sheets in the printer management table PT of the printer 20B, and then transmits a notification to the server 30 that the addition has been successful (S275). Upon receiving the notification in S275, server 30 adds, in the server management table ST, the printable number of sheets taken over to the printer 20B to the current printable number of sheets of the printer 20B (S277).

For example, as shown in FIG. 18B, by performing the takeover process described above, the printable number of sheets of the printer 20A is set to zero (i.e., a blank state), and the printable number of sheets of the printer 20B is charged with the printable number of sheets "pr1" taken over from the printer 20A. Further, when the activation information for the printer 20B is in the OFF state (e.g., newly purchased) at the time of takeover, the activation information for the printer 20B after replacement is turned ON at the same time when the activation information for the printer 20A before replacement is turned OFF. The timing for changing the activation information of the printers 20A and 20B is not limited, but for example, the server 30 may transmit an instruction to the printer 20A to turn off the activation information of the printer 20A in the instruction in S249. Further, the server 30 may transmit to the printer 20B an instruction to turn ON the activation information in conjunction with the instruction in S273. Alternatively, when the printer 20B receives the instruction to increase the printable number of sheets in S273, the printer 20B may automatically turn on the activation information and notify the server 30 of the result in S275. Furthermore, since the takeover has been completed, the server 30 sets the replacement application information for the printer 20A to the OFF state. Further, the server 30 deletes the takeover code 97 associated with the printer 20A because the takeover has been completed.

The server 30 transmits a completion notification to the portable terminal device 10 that the takeover is complete (S279). When receiving the completion notification (S227: YES in FIG. 15), the portable terminal device 10 executes post-processing after the takeover (S229). For example, as shown in FIG. 17, after displaying the screen 125, the portable terminal device 10 displays the screen 127 (S279) upon receipt of the completion notification in S279. The portable terminal device 10 displays, on the screen 127, a message 129 stating that the takeover is completed and an icon 131 indicating the word "OK." In this way, it is possible to notify the user that the process of transferring the printable number of sheets to the printer 20 has been completed. When the icon 131 is selected, the portable terminal device 10 displays the screen 81 (S281). At this time, the portable terminal device 10 displays the icon 82 of the printer 20A before the replacement in a state different from that before the transfer, for example, by displaying the icon 82 of the printer 20A before the replacement in a grayed-out state as a post-processing step of S229. When the grayed-out icon 82 of the printer 20A is selected, the portable terminal device 10 displays text such as "this printer is not available" on the screen 81 and does not receive any operations on the printer 20. Alternatively, the portable terminal device 10 may perform the post-processing to remove the icon 82 of the printer 20A from the screen 81. The portable terminal device 10 may receive operations on the printer 20A with its functions being restricted (e.g., only checking the status). The server 30 may perform the post-processing. For example, the server 30 may instruct all users' portable terminal devices 10 that have executed user registration for the printer 20A to gray out the printer 20A. Alternatively, the printer 20 may perform post-processing. The printer 20 may instruct the portable terminal device 10, which has previously transmitted a printing order to the printer 20 itself, to gray out the process.

The printing system 1 is an example of a transferring system. The portable terminal device 10 is an example of an information processing device. The application 12B is an example of a program. The display 14 and the input I/F 15 are examples of a user interface. The printer 20A is an example of a first recording device. The printer 20B is an example of a second recording device. The printer memory 26B is an example of a recording device memory. The takeover code is an example of replacement identification information. The application 12B is an example of a program. The device ID is an example of a recording device identification information. The printable number of sheets in the server management table ST is an example of server-side recording permission information and server-side permitted recording amount. The printable number of sheets in the printer management table PT is an example of recording device side recording permission information and a recording device-side permitted recording amount. S215 is an example of a transferring operation and a transferring step. S211 and S213 are an example of a first receiving process. S203 is an example of an obtaining process. S167 is an example of a replacement application process. S221 is an example of a notifying process. S229 is an example of an inactivating process. S249 is an example of a restricting process. S261 is an example of a first transmitting process. S223 is an example of a determining process. S225 is an example of an approval notifying process. S263 is an example of a user authentication process. S265 is an example of a reducing notifying process. S273 is an example of an increasing notifying process. S243 is an example of a communication determining process. S245 is an example of a notifying process of notifying that communication is not possible.

(Effect) According to the embodiments described above, the following effects are achieved.

(1) The portable terminal device 10 according to the present embodiment transmits, to the server 30, a takeover instruction (an example of a transferring instruction) that causes the server management table ST to store the printable number of sheets in the server management table ST associated with the device ID of printer 20A in the server management table ST associated with the device ID of printer 20B (S215). According to this, the portable terminal device 10 transmits an instruction, to the server 30, to perform the takeover of the printable number of sheets. Therefore, the printable number of sheets takeover instruction can be executed from a remote location away from the printer 20, such as outside of a LAN. Further, the server 30 can manage the printable number of sheets for each of the printers 20 by associating the printable number of sheets with the device ID. Further, the user can transfer the printable number of sheets charged by the user to another printer 20. This allows for a new printing service that is highly convenient for users.

(2) The portable terminal device 10 receives input of a takeover code 97 that identifies the printer 20A before replacement via the input I/F 15 (S213). The portable terminal device 10 transmits the takeover code 97 received in S213 to the server 30 (S215). According to this, by associating the takeover code 97 with the printer 20A by the server 30 in advance, the server 30 can identify the printer 20A to be replaced based on the takeover code.

(3) The portable terminal device 10 causes the server 30 to determine whether the portable terminal device 10 can communicate with the printer 20A identified based on the takeover code 97 (S247). Since the printable number of sheets decreases with the printing process, it is necessary to obtain the latest printable number of sheets from the printer 20A before the transfer. Therefore, by checking the communication with the printer 20A before replacement prior to starting the transfer of the printable number of sheets, or the like, appropriate measures can be taken, such as informing the user when communication is not possible.

(4) Before performing the takeover process, the portable terminal device 10 transmits a replacement application notification to the server 30 to request the replacement of the printer 20A (S167). The portable terminal device 10 obtains the takeover code 97 of the printer 20A that has been approved to be replaced by the replacement application notification from the server 30 (S203). According to this, by requesting to the server 30 for the printer 20A to be replaced in advance, the server 30 can issue a takeover code 97 to the user after associating the device ID of the printer 20A with the takeover code 97 on the server 30 side.

(5) The portable terminal device 10 receives the selection of the printer 20B as the transfer destination in S211 via the input I/F 15, and receives the input of the takeover code 97 for the selected printer 20B (S213). Based on the fact that the portable terminal device 10 has obtained the printable number of sheets for the printer 20A from the server 30 (S219: YES), the portable terminal device 10 displays the printable number of sheets to be taken over on the display 14 (S221). This allows the user to check whether or not the printable number of sheets to be transferred is correct before actually transferring the printable number of sheets. This suppresses the occurrence of takeover the wrong printable number of sheets.

(6) Based on the fact that the portable terminal device 10 has obtained the replacement request notification from the server 30 (S161: YES), the portable terminal device 10 receives whether or not to replace the printer 20A (S165). Based on the receipt of the instruction to replace (S192 in FIG. 14), the portable terminal device 10 performs the replacement application notification of S167. According to this, after asking the user whether or not to replace the printer, the system can perform tasks such as issuing the takeover code 97 for the printer 20A that needs to be replaced and shipping the new printer 20B. When the user does not use the printing system 1 continuously, the user can stop using the service by not transmitting the replacement application notification.

(7) Based on the fact that the portable terminal device 10 receives the transfer completion notification from the server 30 that the transfer of the printable number of sheets has been completed (S227: YES), the portable terminal device 10 performs a post-processing operation (S229) that does not receive any operation for the printer 20A. In S229, the portable terminal device 10 may gray out the icon 82 of the printer 20A and perform inactiving process that does not receive any operations on the printer 20A. In this way, the occurrence of erroneous operations, such as issuing a print instruction to a printer 20A that has already been replaced, can be suppressed.

(8) When receiving a transfer instruction from the portable terminal device 10 (S215), the server 30 restricts the printing operation of the printer 20A (S249). According to this, it is possible to suppress that printing is executed by the printer 20A before or during the transfer of the printable number of sheets and that the printable number of sheets fluctuates.

(9) Based on receipt of the transfer instruction in S215, the server 30 transmits the printable number of sheets associated with the printer 20A to the portable terminal device 10 as the printable number of sheets to be transferred (S261). The portable terminal device 10 checks with the user whether or not the received printable number of sheets is correct via the display 14 and the input I/F 15 (S223). According to this, before actually transferring the printable number of sheets, the user can check whether the printable number of sheets to be transferred is correct or not. This suppresses the occurrence of transferring the wrong printable number of sheets.

(10) Based on the receipt of the S215 instruction, the server 30 updates the printable number of sheets of the printer 20A in the server management table ST with the number of sheets that can be printed by the printer 20A (S259), and then executes S261. According to this, the printable number of sheets in the server management table ST is updated (synchronized) with the latest printable number of sheets of the printer 20A, and it becomes possible to make the user check the latest printable number of sheets. A more accurate printable number of sheets can be presented to the user.

(11) When the printable number of sheets to be transferred has been approved in S223 (S223: YES), the portable terminal device 10 transmits an approval notice to the server 30 (S225). The server 30 checks whether the user who performed the approval is the user associated with printer 20A (S263). According to this, it is possible to check the user who approved the transfer and the user who is using the printer 20A, and to suppress the occurrence of illegitimate transfer of the printable number of sheets.

(12) Based on the instruction in S215, the server 30 transmits, to the printer 20, a zero instruction (an example of a reducing instruction) that sets the printable number of sheets of the printer 20A to zero (S265).

When receiving a response to S265 (S269), the server 30 transmits an addition instruction (an example of an increasing instruction) to the printer 20B that increases the printable number of sheets. According to this, the printable number of sheets of the printer 20B after replacement can be increased while the printable number of sheets of the printer 20A before replacement is surely reduced. The occurrence of unauthorized use of the printable number of sheets can be suppressed. It is noted that, a part of the printable number of sheets of the printer 20A may be transferred to the printer 20B.

(13) The server 30 checks whether the server 30 can communicate with the printer 20A (S243), and if the server 30 cannot communicate with the printer 20A, the server 30 transmits a connection request to the portable terminal device 10 (S245). According to this, when communication with the printer 20A is not possible and the latest printable number of sheets cannot be obtained, the user can be prompted to check the communication status of the printer 20A.

OTHER EMBODIMENTS

Figure 19:
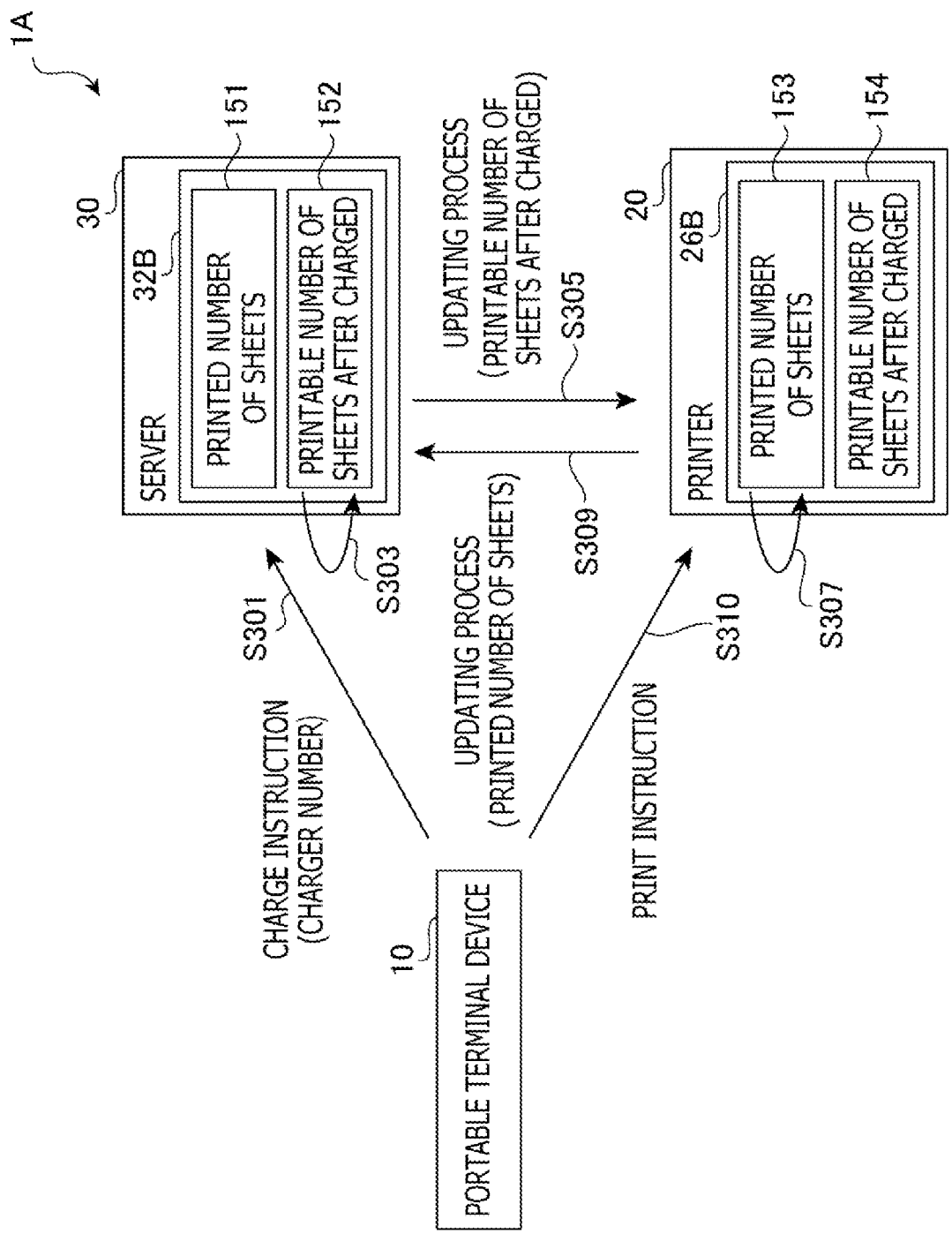
FIG. 19 shows another embodiment.

In the above embodiment, there is described an example in which the printer 20 and server 30 synchronize the remaining printable number of sheets after decreasing the number of sheets due to printing. The updating process according to the present application is not limited to the process of synchronizing the printable number of sheets. FIG. 19 shows another embodiment of the printing system 1A. It is noted that, in the following description, the same symbols are assigned to the same configurations as in the above embodiment, and their descriptions are omitted as appropriate.

As shown in FIG. 19, for example, the server 30 of the printing system 1A stores the printed number of sheets 151 and the number of sheets after charged 152 in the server memory 32B. The printer 20 stores the number of printed sheets 153 and the printable number of sheets after charged 154 in the printer memory 26B. The numbers of printed sheets 151 and 153 are the total numbers of printed sheets printed by the printer 20. That is, the numbers 151 and 153 are different from the printable number of sheets in the above embodiment, and are the numbers of sheets that increase as the number of printings increases. The printable numbers of sheets after charged 152, and 154 are the total numbers of charge numbers that have been charged by the portable terminal device 10. That is, the printable numbers of sheets after charged (152, 154) are the numbers of sheets that increase each time they are charged from the portable terminal device 10. In such a case, the printable numbers of sheets are the printable numbers of sheets after charged 152 and 154 minus the numbers of printed sheets 151 and 153, respectively. With respect to these numbers of printed sheets 151, 153 and the printable numbers of sheets after charged 152, 154, the printer 20 and the server 30 execute an update process that updates one information based on the other information. The printed number of sheets 151 and the printable number of sheets after charged 152 are examples of server-side recording permission information. The printed number of sheets 153 and the printable number of sheets after charged 154 are examples of the recording device-side recording permission information.

In detail, for example, the printer 20 is charged with 5000 sheets at the time of purchase as the initial value of the printable number of sheets after charged 154. The printer 20 increases the printed number of sheets 153 by the number of sheets printed when the printing process is executed (S307). For example, if the printed number of sheets 153 is subtracted from the printable number of sheets after charged 154, i.e., the printable number of sheets becomes zero, the printer 20 restricts printing operations thereafter. Alternatively, the printer 20 may calculate the printable number of sheets before printing, and if the printable number of sheets is not sufficient, printing may not be performed. For example, if "the condition that the printable number of sheets exceeds the number of sheets designated for printing" or "the condition that (the printed number of sheets 153+the number of sheets designated for printing) exceeds the printable number sheets after charged 154" is satisfied before printing (which is an example of a condition where "recording permission information" satisfies a particular condition, in this application), the printer 20 may stop performing the printing based on the print instruction. Further, the server 30 may examine the printable number of sheets by subtracting the printed number of sheets 151 from the printable number of sheets after charged 152, and then control the activation information of the printer 20, and the like. Therefore, in the present embodiment, the printable number of sheets (an example of the amount of printing permission in the present application) of itself can be managed by calculation without being stored by the device.

When receiving a charge instruction from the portable terminal device 10 (S301), the server 30 adds the charge number (e.g., 1,000 sheets) instructed by the charge instruction to the printable number of sheets after charged 152 (S303). The server 30 updates (overwrites) the printable number of sheets after charged 154 of the printer 20 with the printable number of sheets after charged 152 (S305). In this way, to the printable number of sheets after charged 154 of the printer 20, the charge number is added (e.g., 5,000+1,000=6,000 sheets). It is noted that, instead of overwriting the printable number of sheets after charged 154, the server 30 may notify the printer 20 of the charge number to be added and have the printer 20 perform the addition process, as in the above embodiment. Alternatively, the server 30 may notify the printer 20 of the difference between the printable number of sheets after charged 152 and the printed number of sheets 151. Then, the printer 20 may calculate and update the printable number of sheets after charged 154 by adding the value of the received difference to the printed number of sheets 153.

The printer 20 sets the printable number of sheets after charged 154 (e.g., 6,000 sheets) as the upper limit, and when receiving a print instruction from the portable terminal device 10, or the like (S310), the printer 20 executes printing until the printed number of sheets 153 exceeds the printable number of sheets after charged 154. As described above, the printer 20 increases the printed number of sheets 153 by the printed number of sheets each time the printing is completed, for example (S307). Then, the printer 20 updates (overwrites) the printed number of sheets 151 in the server 30 with the printed number of sheets 153 after increased (S309).

The transfer process of the printable number of sheets in the embodiment shown in FIG. 19 can also be performed in the same way as in the above embodiment (FIG. 15 and FIG. 16). For example, in S255-259 of FIG. 15, the server 30 synchronizes the number of printed sheets 151 and the printable number of sheets after charged 152 associated with the device ID of printer 20A before replacement with the number of printed sheets 153 and the number of charged sheets 154 owned by the printer 20A, to update to the latest information. It is noted that, since the server 30 has the latest information on the printable number of sheets after charged 152, it is not necessary to update the charged number 154 with the printable number of sheets after charged 152. After updating, the server 30 subtracts the number of printed sheets 151 from the printable number of sheets after charged 152 of the printer 20A to calculate the printable number of sheets of the printer 20A before the takeover. The server 30 notifies the portable terminal device 10 of this calculated printable number of sheets as the printable number of sheets to be taken over (S261). After obtaining the user's approval (S263), the server 30 sets the number of printed sheets 153 and the printable number of sheets after charged 154 of the printer 20A to zero (S267) and sets the number of printed sheets 151 and the printable number of sheets after charged 152 associated with the printer 20A owned by the server 30 side to the printer 20B after replacement. This allows the printable number of sheets can be transferred from the printer 20A to the printer 20B. In this way, even when the printable number of sheets is managed based on the printable number of sheets after charged (152) or the number of printed sheets (151), the transfer process of the printable number of sheets can be performed.

In the other embodiment described above, the number of printed sheets 151 and the printable number of sheets after charged 152 are examples of server-side recording permission information. The number of printed sheets 153 and the printable number of sheets after charged 154 are examples of recording device-side recording permission information. The amounts obtained by subtracting the numbers of printed sheets 151 and 153 from the printable numbers of sheets after charged 152 and 154 are examples of the server-side allowable recording amount, and the recording device-side allowable recording amounts.

Effects

According to the embodiment described above, the following effects can be achieved.

The server 30 transmits the printable number of sheets after charged 152, which is increased by the charge number received from the portable terminal device 10, to the printer 20 and updates the printable number of sheets after charged 154 of the printer 20 (S305). Further, the printer 20 updates the printed number of sheets 153 with the printed number of sheets used by the printing operation executed based on the print instruction in S310 (S307). The printer 20 updates the printed number of sheets 151 on the server 30 based on the updated printed number of sheets 153 (S309). According to the above, as the server 30 notifies the printable number of sheets after charged 152, and as the printer 20 notifies the printable number of sheets after charged 153, the printable number of sheets can be managed by each other. The number of sheets printed can be managed mutually. The frequency of communication in the update process can be reduced.

MODIFICATIONS

Although the above concrete examples according to the present invention have been described in detail, they are merely illustrative examples and do not limit the scope of the claims. The technology set forth in the claims includes various modifications and alternatives to the concrete examples given in the above examples. Some modifications of the above embodiments are listed below.

In the above embodiments, the portable terminal device 10, which is a smartphone, is employed as an information processing terminal according to the present application, but it is not limited to this. Desktop PCs, notebook PCs, tablet PCs, and other terminal devices can be employed as the information processing device. For one printer 20, print instructions or purchase of additional printable number of sheets may be implemented from multiple portable terminal devices 10. Although the server 30 communicates with one portable terminal device 10 in the present embodiment, the server 30 may be configured to communicate with multiple portable terminal devices 10. For example, the server 30 may be configured to receive charge instructions from multiple portable terminal devices 10, add the charge number to the printable number of sheets associated with each printer 20 based on the charge instructions from each portable terminal device 10, and store the charge number in the server memory 32B. This allows each user to perform a charge to a personal or shared printer 20 from any location. In such a case, the server 30 may configured to notify each portable terminal device 10 of the updated printable number of sheets. The printer 20 may be configured such that the user can refill the ink (each ink tank in the tank 23 can be replaced). Other means for replenishing consumables such as ink include a configuration in which the ink or other consumables can be injected into the tank 23 from a bottle containing the ink or other consumables. The inkjet printer 20 is used as the recording device in this application, but a laser or thermal printer can also be used. The recording device is not necessarily limited to printers for individual users, but can also be commercial or industrial printing devices. Accordingly, the recording device may be a multifunctional peripheral with scanning, copying, and facsimile functions, in addition to the printing function. The recording device may be a laser marker that uses a laser to mark against a metallic member or the like. Therefore, the recording medium in this application is not limited to paper, but can also be a metal member, and the like.

The printer 20 is configured to store the printer management table PT in the printer memory 26B, but is not necessarily limited to this configuration. For example, the printer 20 may be equipped with a reading I/F that configured to read IC cards, memory cards, and the like. The printer 20 may then obtain and use the information in the printer management table PT, such as device ID and printable number of sheets, from the IC card, or the like, loaded to the reading I/F. That is, the printer 20 may be configured to manage the printer management table PT with an IC card or the like. Alternatively, the printer 20 may store and manage the information in the printer management table PT, such as the printable number of sheets, in a memory other than the memory in which the printer program 26B1 is stored, such as the memory provided to the ink tank in the printing unit 25, or in the case of a laser printer, a memory provided to the toner cartridge, a memory provided to the photoreceptor drum, or the like. The application 12B that executes the initial device setting process, printing process, charging process, requesting process, and the takeover process can be another application program. The permitted recording amount indicated by the recording permission information in this application is not necessarily limited to the number of copies printed. For example, the permitted recording amount can be a consumption amount of ink or toner. The permitted recording amount may be the amount of ink that enables discharge for how many dots (pixels) or the amount of ink that is allowed to be used (how many ml, and the like). Alternatively, the permitted recording amount may be defined by the number of rotations of a member that rotates with the printing operation, such as a photoreceptor drum.

The processes in S249 and S251 to restrict the printing of the printer 20A before replacement may be executed by instructing the printer 20A from the portable terminal device 10.

In the above embodiments, the printable number of sheets of the printer 20A is transferred to another printer 20B, but it is not necessarily limited to this configuration. The printable number of sheets of the printer 20A may be split and transferred to multiple printers 20B. Alternatively, the printable number of sheets from multiple printers 20A may be consolidated and transferred to a single printer 20B.

In the above, a replacement application is received from the user in the requesting process. However, the server 30 may automatically issue a takeover code 97 and ship the printer 20B to the user of the printer 20A which the server 30 determines to be necessary for replacement, regardless of whether the user has submitted a request.

A device other than the server 30 (e.g., the portable terminal device 10 or the printer 20) may perform some or all of the processes of the server 30, such as checking the connection in S243, restricting printing in S249, and obtaining the printable number of sheets in S255. Similarly, the server 30 may perform the processes of the portable terminal device 10 and/or the printer 20.

The portable terminal device 10 may store the printable number of sheets obtained from the printer 20 or the server 30 in the terminal memory 12 and notify the user. This allows, for example, the user to check the latest printable number of sheets by operating the portable terminal device 10. The portable terminal device 10 may cooperate with the server 30 and the printer 20 to perform the synchronization process for the printable number of sheets. The user can check the latest printable number of sheets and issue takeover or other order to the server 30, even if the user is in a location where communication with the printer 20 is not possible (e.g., outside the LAN). The replacement identification information when replacing the printers 20 is not limited to the takeover code 97. For example, the serial number of the printer 20, which is assigned to each product, can be used as the replacement identification information. In such a case, the portable terminal device 10 does not have to obtain the exchange identification information from the server 30 as in the case of the takeover code 97. For example, a serial number may be printed on a box of the replacement printer 20B to be shipped from the vendor, and the server 30 may determine the printable number of sheets, and the like to be taken over by receiving that serial number at the time of takeover. In such a case, there is no need for a requesting process to request the issuance of the takeover code 97.

In the above embodiments, the replacement of the printer 20 is performed based on the remaining ink amount. However, the replacement of the printer 20 may be performed when the printer 20 malfunctions or when the user desires a different printer 20 than the currently used printer 20. In the charging process shown in FIG. 9, by selecting the desired charge icon 74 from the charge screen 71 displayed on the display 14, the charge number corresponding to the selected charge icon 74 is added to the printable number of sheets. However, it is also possible to configure the system so that the user can input a desired charge number, the charge number input by the user is charged to the printable number of sheets, and the vendor charges the user according to the charge number input by the user. The printing system 1 may be configured to charge points or ink volume, not limited to a sheet-charging configuration. In such a case, the amount of points or ink per one printing operation should be calculated based on, for example, whether single-sided or double-sided printing is performed, or the amount of ink used to print out the print data, and the charge amount should be determined from the charged points or ink amount.

What is claimed is:

1. A server configure-configured to communicate with an information processing device and a recording device,
   wherein the recording device includes a recording mechanism configured to perform a recording operation on a recording medium,
   wherein the server includes a server memory capable of storing recording device identification information identifying the recording device and server-side recording permission information indicating a server-side permitted recording amount of recording by the recording mechanism in an associated manner, and
   wherein the server is configured to perform;
   storing server-side recording permission information in an associated manner with first recording device identification information identifying a first recording device in the server memory;
   receiving a transferring instruction including second recording device identification information from the information processing device, the second recording device identification information identifying a second recording device different from the first recording device; and
   a transferring operation in response to receiving the transferring instruction from the information processing device including the second recording device identification information, the transferring operation including storing the server-side recording permission information, which is stored in the server memory in an associated manner with the first recording device identification information, in the server memory in an associated manner with the second recording device identification information received in the transferring instruction.

2. The server according to claim 1, further configured to restrict the recording operation by the first recording device in response to receiving the transferring instruction.

3. The server according to claim 1,
   wherein the server is configured to further perform:
   transmitting, to the information processing device, the server-side recording permission information associated with the first recording device identification information in response to receiving the transferring instruction; and
   receiving, from the information processing device, an approval notification indicating that the server-side permitted recording amount is approved in response to the information processing device receiving an input through a user interface of the information processing device, the input indicating that the server-side permitted recording amount indicated by the server-side recording permission information transmitted from the server is correct.

4. The server according to claim 3,
   wherein the server is configured to perform;
   in response to receiving the transferring instruction, updating the server-side recording permission information associated with the first recording device identification information, based on recording device-side recording permission information received from the first recording device; and
   the transmitting.

5. The server according to claim 3, further configured to determine whether a user who approved the server-side permitted recording amount is a user indicated by a user information associated with the first recording device identification information in response to the receiving the approval notification.

6. The server according to claim 3,
   wherein the server is configured to further perform;
   notifying the first recording device of a reducing instruction to reduce recording device-side permitted recording amount stored in of the first recording device by a particular amount in response to receiving the transferring instruction; and
   notifying the second recording device of an increasing instruction to increase the recording device-side permitted recording amount of the second recording device by the particular amount.

7. The server according to claim 1, further configured to perform:
   determining whether communication with the first recording device is possible in response to receiving the transferring instruction; and
   notifying the information processing device of information indicating that the communication with the first recording device is not possible when the communication determining that the first recording device is not possible.

8. A non-transitory computer-readable storage medium for an information processing device configured to communicate with a recording device and a server, the recording device comprising a recording mechanism configured to perform a recording operation on a recording medium, the server comprising a server memory capable of storing recording device identification information identifying the recording device and server-side recording permission information indicating a server-side permitted recording amount of recording by the recording mechanism in an associated manner,
   wherein the non-transitory computer-readable recording medium contains computer-executable instructions, the computer-executable instructions being configured to, when executed by a controller of the information processing device, cause the information processing device to perform a transferring operation, the transferring operation including transmitting a transferring instruction to the server, the transferring instruction including second recording device identification information identifying a second recording device different from a first recording device, the first recording device being identified by first recording device identification information, the transferring instruction being an Instruction to cause the server to store the server-side recording permission information, which is stored in the server memory in an associated manner with the first recording device identification information, in the server memory in an associated manner with the second recording device identification information included in the transferring instruction.

9. The non-transitory computer-readable storage medium according to claim 8,
   wherein the information processing device comprises an input interface,
   wherein the computer-executable instructions are further configured to, when executed by the controller, cause the information processing device to perform:

receiving a replacement identification information identifying the first recording device subject to replacement through the input interface; and transmitting the received replacement identification information to the server.

10. The non-transitory computer-readable storage medium according to claim 9, wherein the computer-executable instructions are further configured to, when executed by the controller, cause the information processing device to perform, in the transferring operation:

causing the server to determine whether communication with the first recording device identified based on the replacement identification information is possible.

11. The non-transitory computer-readable storage medium according to claim 9, wherein the computer-executable instructions are further configured to, when executed by the controller, cause the information processing device to perform:

requesting for replacement of the first recording device to the server before performing the transferring operation; and obtaining, from the server, the replacement identification information of the first recording device that the replacement requested in the requesting is approved.

12. The non-transitory computer-readable storage medium according to claim 11, wherein the computer-executable instructions is further configured to, when executed by the controller, cause the information processing device to perform:

receiving selection of the second recording device as a transfer destination through the input interface and the replacement identification information received in the receiving being further of the selected second recording device; and notifying recording permission information transferred to the second recording device from the first recording device in response to receiving the server-side recording permission information of the first recording device from the server.

13. The non-transitory computer-readable storage medium according to claim 11, wherein the computer-executable instructions is further configured to, when executed by the controller, cause the information processing device to perform:

in response to receiving, from the server, notification indicating that replacement of the first recording device is necessary, receiving an instruction whether to replace the first recording device that replacement is necessary; and in response to receiving an instruction to replace the first recording device, the requesting for replacement of the first recording device to the server.

14. The non-transitory computer-readable storage medium according to claim 9, wherein the computer-executable instructions is further configured to, when executed by the controller, cause the information processing device not to receive an operation with respect to the first recording device in response to receiving notification indicating that the transferring operation is completed.

15. A transfer method for a server configured to communicate with an information processing device and a recording device, wherein the recording device includes a recording mechanism configured to perform a recording operation on a recording medium, wherein the server includes a server memory capable of storing recording device identification information identifying the recording device and server-side recording permission information indicating a server-side permitted recording amount of recording by the recording mechanism in an associated manner, and wherein the transfer method comprises performing;

storing server-side recording permission information in an associated manner with first recording device identification information identifying a first recording device in the server memory;

receiving a transferring instruction including second recording device identification information from the information processing device, the second recording device identification information identifying a second recording device different from the first recording device; and a transferring operation in response to receiving the transferring instruction from the information processing device including the second recording device identification information, the transferring operation including storing the server-side recording permission information, which is stored in the server memory in an associated manner with the first recording device identification information, in the server memory in an associated manner with the second recording device identification information included in the transferring instruction.

\* \* \* \* \*